(12) United States Patent
Thorsell

(10) Patent No.: US 12,178,150 B2
(45) Date of Patent: Dec. 31, 2024

(54) ATTACHMENT ASSEMBLY FOR AGRICULTURAL IMPLEMENTS

(71) Applicant: Great Plains Manufacturing, Inc., Salina, KS (US)

(72) Inventor: Erik Thorsell, Olathe, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 320 days.

(21) Appl. No.: 17/827,696

(22) Filed: May 28, 2022

(65) Prior Publication Data

US 2022/0287220 A1  Sep. 15, 2022

Related U.S. Application Data

(63) Continuation of application No. 16/852,653, filed on Apr. 20, 2020, now Pat. No. 11,343,954.

(60) Provisional application No. 62/836,401, filed on Apr. 19, 2019.

(51) Int. Cl.
*A01B 71/06* (2006.01)
*A01B 59/06* (2006.01)

(52) U.S. Cl.
CPC ............ *A01B 71/06* (2013.01); *A01B 59/066* (2013.01)

(58) Field of Classification Search
CPC ........................... A01B 71/106; A01B 59/066
See application file for complete search history.

(56) References Cited

U.S. PATENT DOCUMENTS

| | | | |
|---|---|---|---|
| 5,193,623 A * | 3/1993 | Burette | A01B 71/063 180/53.3 |
| 5,657,825 A * | 8/1997 | Englund | A01B 59/062 280/416.2 |
| 6,896,070 B2 | 5/2005 | Wood, Jr. et al. | |
| 7,487,843 B2 | 2/2009 | Tuttle et al. | |
| 2006/0055140 A1* | 3/2006 | Trefz et al. | A01B 71/063 280/100 |
| 2008/0115983 A1* | 5/2008 | Priepke et al. | A01B 71/063 180/53.3 |
| 2008/0142231 A1 | 6/2008 | Priepke et al. | |
| 2015/0107211 A1 | 4/2015 | Halter et al. | |
| 2015/0122518 A1 | 5/2015 | Huber | |

FOREIGN PATENT DOCUMENTS

WO 2014/125466 A1 8/2014

* cited by examiner

*Primary Examiner* — Tara Mayo
(74) *Attorney, Agent, or Firm* — Hovey Williams LLP; Kameron D. Kelly

(57) ABSTRACT

An attachment assembly for connecting an agricultural implement to a tractor. The attachment assembly comprises a tractor-side frame configured to extend from a rear of the tractor, and an implement-side frame configured to be removably attached to the implement. The implement-side frame is configured to rotate with respect to the tractor-side frame.

19 Claims, 23 Drawing Sheets

ATTACHMENT ASSEMBLY FOR AGRICULTURAL IMPLEMENTS

RELATED APPLICATION

The present application is a continuation patent application of U.S. application Ser. No. 16/852,653, filed on Apr. 20, 2020, and entitled "ATTACHMENT ASSEMBLY FOR AGRICULTURAL IMPLEMENTS," which claims priority benefit to prior-filed U.S. Provisional Patent Application Ser. No. 62/836,401, filed on Apr. 19, 2019, and entitled "ATTACHMENT ASSEMBLY FOR AGRICULTURAL IMPLEMENTS." The entirety of the above-identified prior-filed patent applications are hereby incorporated by reference into the present non-provisional continuation patent application.

FIELD OF THE INVENTION

Embodiments of the present invention are generally directed to an attachment assembly for operably connecting an agricultural implement to a prime mover. More particularly, embodiments of the present invention are directed to an attachment assembly configured to quickly and efficiently connect, in an operable manner, an agricultural implement to a prime mover and/or to a power take-off of the prime mover.

BACKGROUND OF THE INVENTION

Certain agricultural implements, such as tillers, rotary cutters, seeders, snow blowers/removers, power rakes, brooms, saws, and the like, are powered by a power take-off from a prime mover (hereinafter referred to as a "tractor"). Attaching such agricultural implements to the tractor can be a difficult and time-consuming process. For example, agricultural implements will often be configured for attachment to a three-point hitch extending from the rear of the tractor. Such a three-point hitch will include a pair of spaced apart lower arms (i.e., lifting arms) and an upper, central arm (i.e., a top link). Generally, the lifting arms and the top link will be arranged in a triangular configuration, with the lifting arms being actuatable (e.g., raising and lowering) by the tractor's hydraulic system. As such, when the agricultural implement is attached to the three-point hitch, the agricultural implement can be raised and lowered by the tractor.

To attach the agricultural implement to the three-point hitch, the implement will generally include a set of hitch pins configured to engage with the lifting arms and with the top link of the three-point hitch. The hitch pins may be secured directly to the agricultural implement and/or may be coupled to the agricultural implement via one or more brackets. Regardless, the agricultural implement will generally include two lower hitch pins, which are each configured to engage with hitch points at free ends of the lifting arms. The agricultural implement will generally also include an upper hitch pin configured to engage with a hitch point on a free end of the top link.

Although a three-point hitch, as described above, can be used to connect an agricultural implement to a tractor, facilitating such a connection is often labor-intensive and time-consuming. An operator of the tractor will need to maneuver the tractor to a proper position for connection. The operator will then be required to dismount the tractor to connect the implement to the three-point hitch. Such a process will then need to be repeated each time the operator needs to attach a new implement to the tractor. Furthermore, the use of a three-point hitch generally does not help facilitate the connection of the tractor's power take-off to the implement, if necessary.

SUMMARY OF THE INVENTION

In one embodiment of the present invention, there is provided an attachment assembly for connecting an agricultural implement to a tractor. The attachment assembly comprises a tractor-side frame configured to extending from a rear of the tractor, and an implement-side frame configured to be removably attached to the implement. The implement-side frame is configured to rotate with respect to the tractor-side frame.

In yet another embodiment of the present invention, there is provided a method of attaching an implement to a tractor. The method comprises a step of providing an attachment assembly extending from a rear of the tractor. The attachment assembly comprises a tractor-side frame and an implement-side frame rotatably coupled with the tractor-side frame. The attachment assembly is configured to be shifted from a closed configuration, in which the implement-side frame is positioned adjacent to the tractor-side frame, to an open configuration, in which at least a portion of the implement-side frame is rotated away from the tractor-side frame. The method includes the additional step of shifting the attachment assembly to the open configuration. The method includes the additional step of securing the implement-side frame to the implement. The method also includes the further step of shifting the attachment assembly to the closed configuration.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
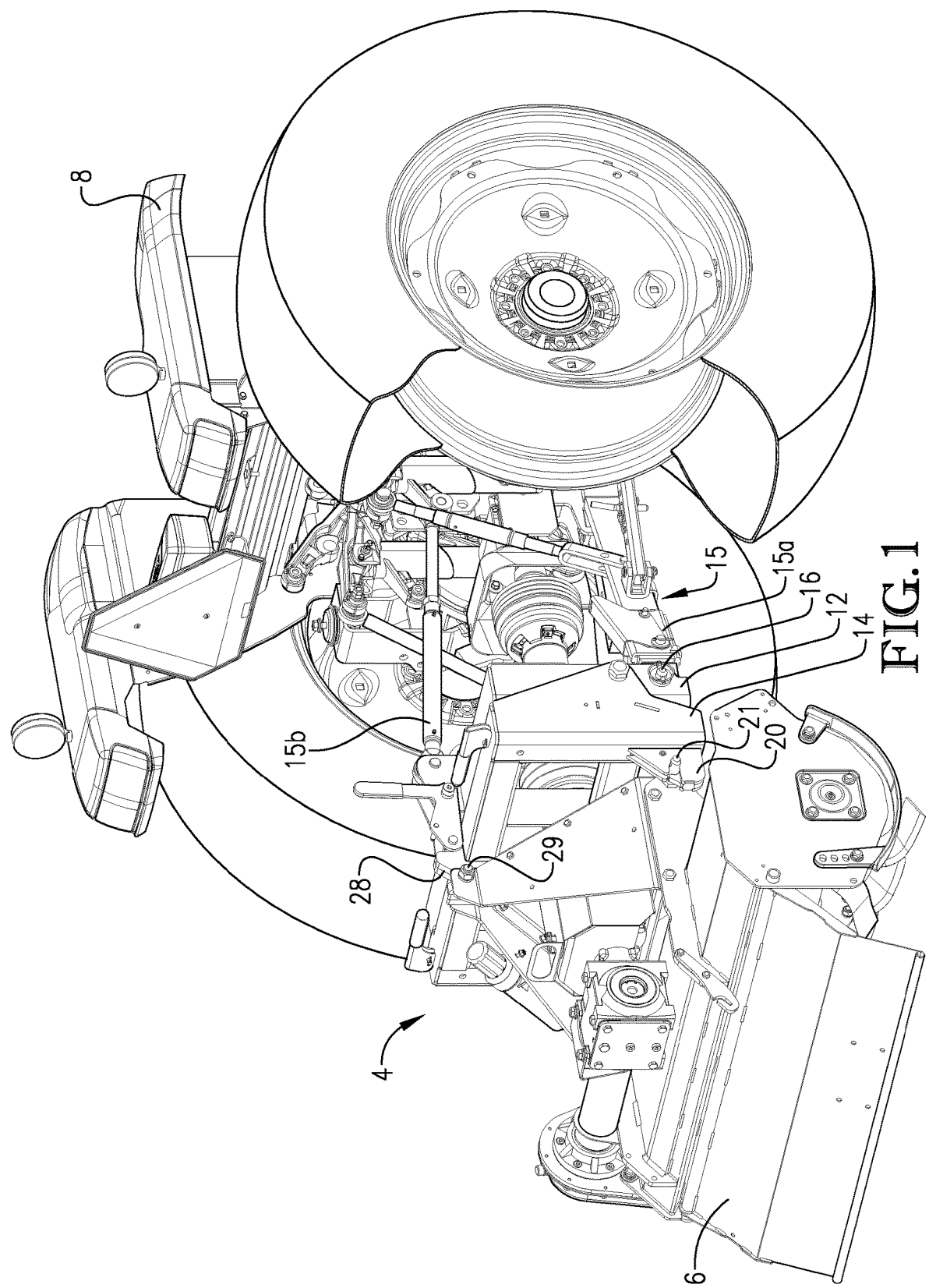
FIG. 1 is a right, rear perspective view of an implement secured to a tractor via an attachment assembly according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Broadly, embodiments of the present invention are directed to an attachment assembly 4, as illustrated in FIGS. 1-4, which may be used to quickly and efficiently connect an agricultural implement 6 (referred to herein as an "implement") to a prime mover 8 (referred to herein as a "tractor"). In some embodiments, the attachment assembly 4 will be configured for use with implements 6 that require rotary power from the tractor 8 for operation. Such implements 6 include, for instance, tillers, rotary cutters, seeders, snow blowers/removers, power rakes, brooms, saws, or the like. Thus, in some embodiments, the attachment assembly 4 will facilitate connection of such implements 6 to the power take-off (referred to herein as "PTO") of the tractor 8. The embodiments shown in FIGS. 1-4 show an exemplary implement 6 in the form of a tiller.

Turning to the attachment assembly 4 in more detail, as shown in FIGS. 5-8, the attachment assembly 4 may comprise a tractor-side frame 12 and an implement-side frame 14. Broadly, as illustrated in FIGS. 1-4, the tractor-side frame 12 is configured to be releasably secured to the tractor 8, while the implement-side frame 14 is configured to be releasably secured to the implement 6. Nevertheless, it should be understood that in some embodiments, the attachment assembly 4 may be permanently integrated with the tractor 8. For example, the tractor-side frame 12 may be permanently secured with and/or form part of a rear end of the tractor 8. As shown in the drawings, each of the tractor-side frame 12 and the implement-side frame 14 may be formed generally in a U-shape. In particular, and with reference to FIGS. 5-8, the tractor-side frame 12 may include a horizontally-extending upper bar 12a and a pair of vertically-extending side bars 12b that extend downward from lateral ends of the upper bar 12a. Similarly, the implement-side frame 14 may include a horizontally-extending upper bar 14a and a pair of vertically-extending side bars 14b that extend downward from lateral ends of the upper bar 14a. In some embodiments, the upper bars 12a, 14a and side bars 12b, 14b may be formed from hollowed panels of steel or other material of sufficient strength. Alternatively or in addition, in some embodiments, at least portions of the upper bars 12a, 14a and/or side bars 12b, 14b may be formed as c-channels. For example, with reference to FIGS. 5 and 6 and as will be discussed in more detail below, forward portions of the side bars 14b of the implement-side frame 14 may be open, so as to permit portions of the side bars 12b of the tractor-side frame 12 to be rotatably secured within the side bars 14b of the implement-side frame 14. Similarly, forward portions of the side bars 12b of the tractor-side frame 12 may be open, so as to permit the portions of the tractor 8 (e.g., the three-point hitch 15 shown in FIGS. 1-4) to be secured within the side bars 12b of the tractor-side frame 12.

As used herein, the terms "front" or "forward" refer to a direction toward the tractor 8 when viewed from behind the tractor 8 and the implement 6 (with reference to FIGS. 1-4), whereas the terms "back," "rear," or "rearward" refer to an opposite direction (i.e., toward the implement 6 when viewed from in front of the tractor 8 and the implement 6). As such, when the attachment assembly 4 is in use to secure an implement 6 to a rear side of a tractor 8 (e.g., FIGS. 1-4), the tractor-side frame 12 is positioned forward of the implement-side frame 14, and the implement-side frame 14 is positioned rearward from the tractor-side frame 12.

Figure 5:
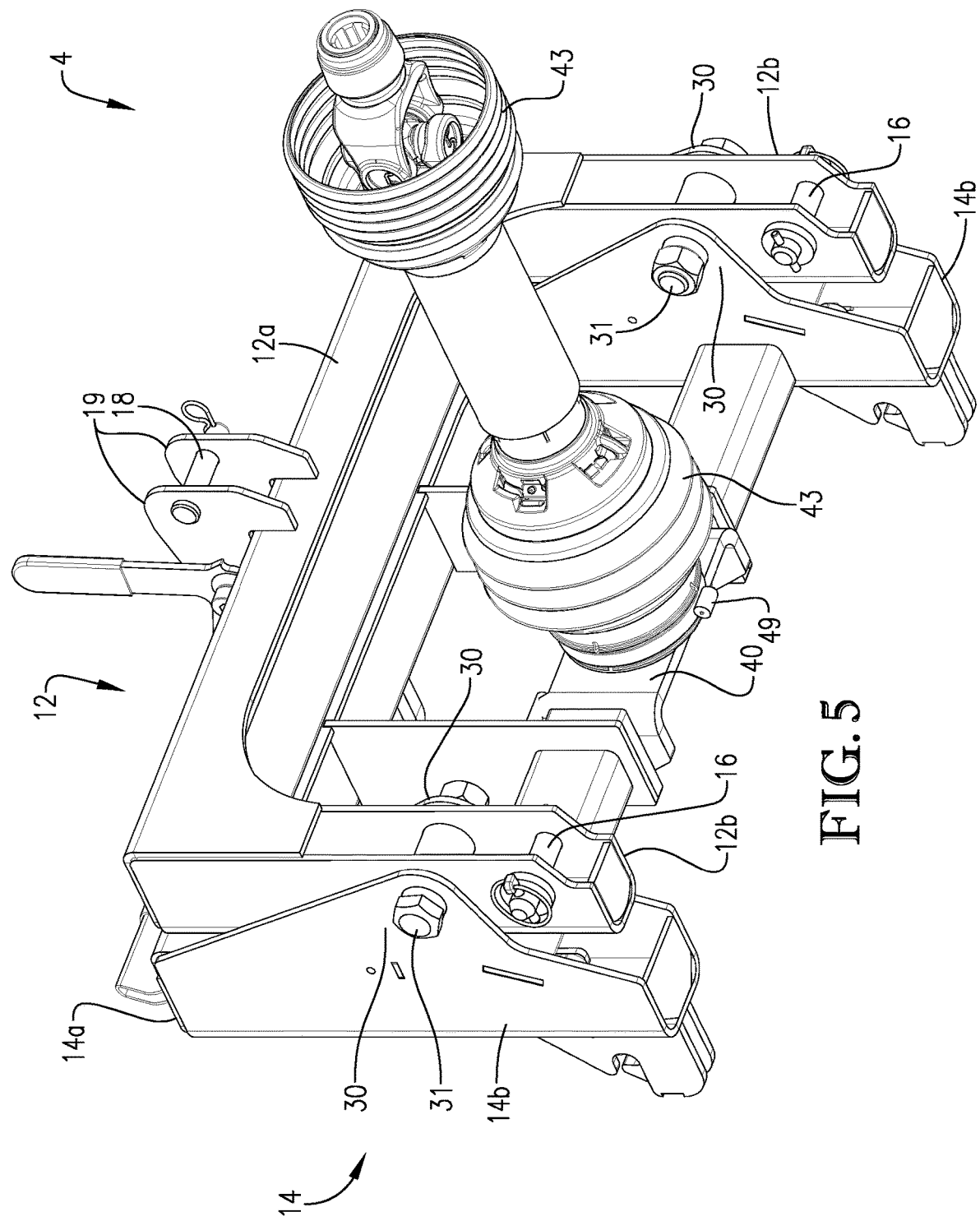
FIG. 5 is a front perspective view of the attachment assembly from FIGS. 1-4, with the attachment assembly in a closed configuration and connected to a power-take off (PTO) connection assembly of the tractor from FIGS. 1-4.
Figure 6:
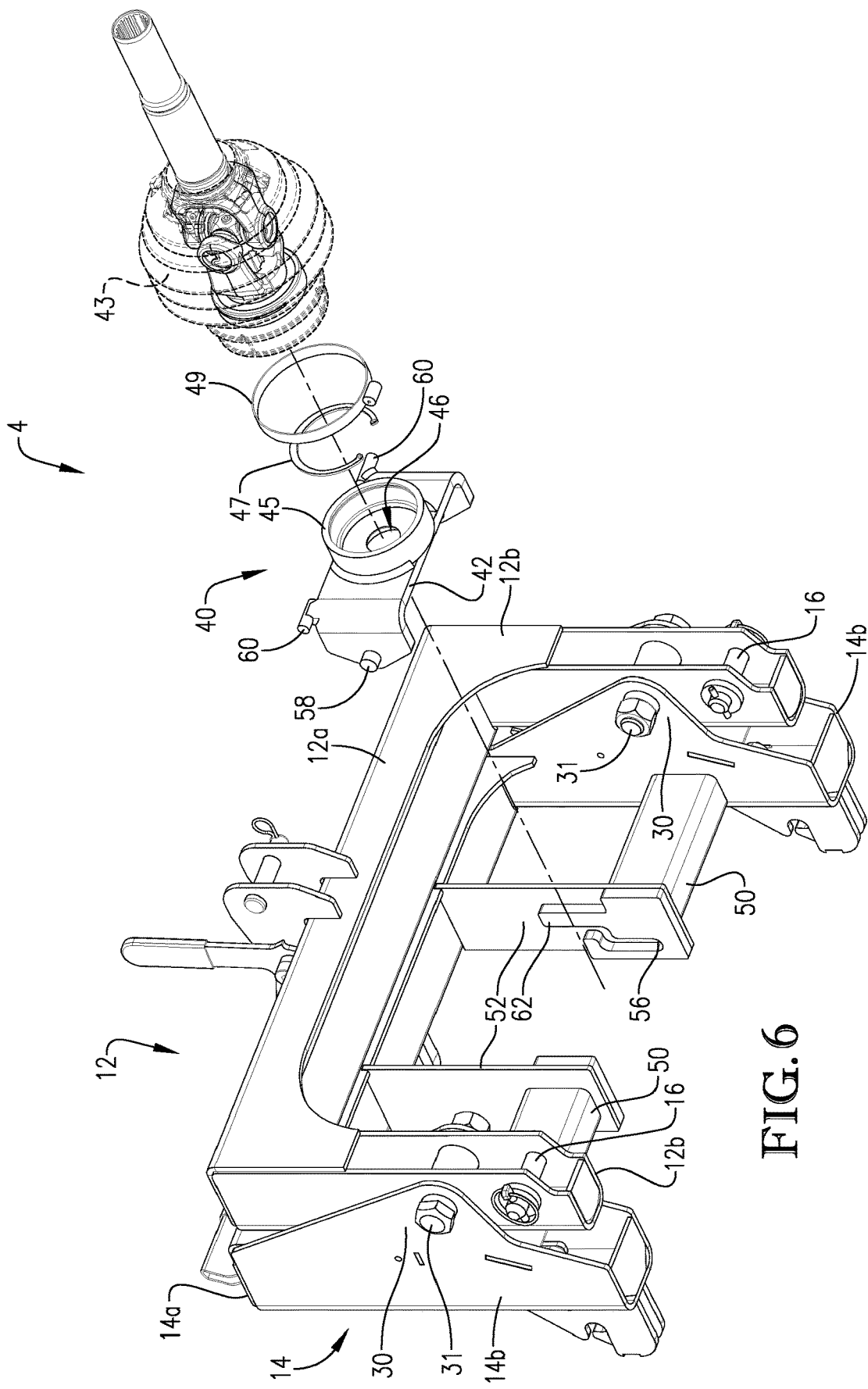
FIG. 6 is a front perspective view of the attachment assembly from FIG. 5, with the PTO connection assembly of the tractor and a PTO adapter of the attachment assembly shown separated from remaining components of the attachment assembly.

Turning to the tractor-side frame 12 in more detail, in some embodiments, each of the side bars 12b may have an open front panel adjacent a bottom end of the side bar 12b, as is shown in FIGS. 5-6. As such, the side bars 12b present an opening into the interior space of the side bar 12b, through which the tractor 8 can be secured to the attachment assembly 4. In more detail, the tractor-side frame 12 can be secured to the three-point hitch 15 of the tractor 8 by, as shown in FIGS. 1-4, inserting ends of lifting arms 15a of the three-point hitch 15 into the interior spaces of the side bars 12b. A lower hitch pin 16 can then be inserted through openings formed in side panels of each of the side bars 12b and through a hitch point of the lifting arm 15a positioned within such side bar 12b. Thus, the lifting arms 15a of the three-point hitch 15 can be secured to the bottoms of the side bars 12b, via the lower hitch pins 16, so as to secure the lower portions of the tractor-side frame 12 of the attachment assembly 4 to the three-point hitch 15 of the tractor 8.

In addition, the upper bar 12a of the tractor-side frame 12 may include an upper hitch pin 18, as shown in FIGS. 5-8, which is held in place between a pair of parallel securing plates 19 that extend upward and/or forward from the upper bar 12a. The upper hitch pin 18 and/or the securing plates 19 may be centrally positioned with respect to the upper bar 12a, such that the upper hitch pin 18 can be secured to an upper hitch point of a top link 15b of the three-point hitch 15, so as to secure a top portion of the tractor-side frame 12 to the three-point hitch 15 of the tractor 8. Specifically, the upper hitch point of the top link 15b of the three-point hitch 15 may be positioned between the securing plates 19, and the upper hitch pin 18 can be inserted through openings formed in the securing plates 19 and the upper hitch point of the top link 15b of the three-point hitch 15 so as to secure the upper portion of the tractor-side frame 12 of the attachment assembly 4 to the three-point hitch 15 of the tractor 8. It is noted, however, that in certain embodiments, the attachment assembly 4 may be permanently secured to the tractor 8 and/or may be integrated with or form part of the tractor 8. For example, the tractor-side frame 12 may be permanently secured to and/or may form part of the rear end of the tractor 8, such that the attachment assembly 4 extends rearward from the rear end of the tractor 8.

Figure 7:
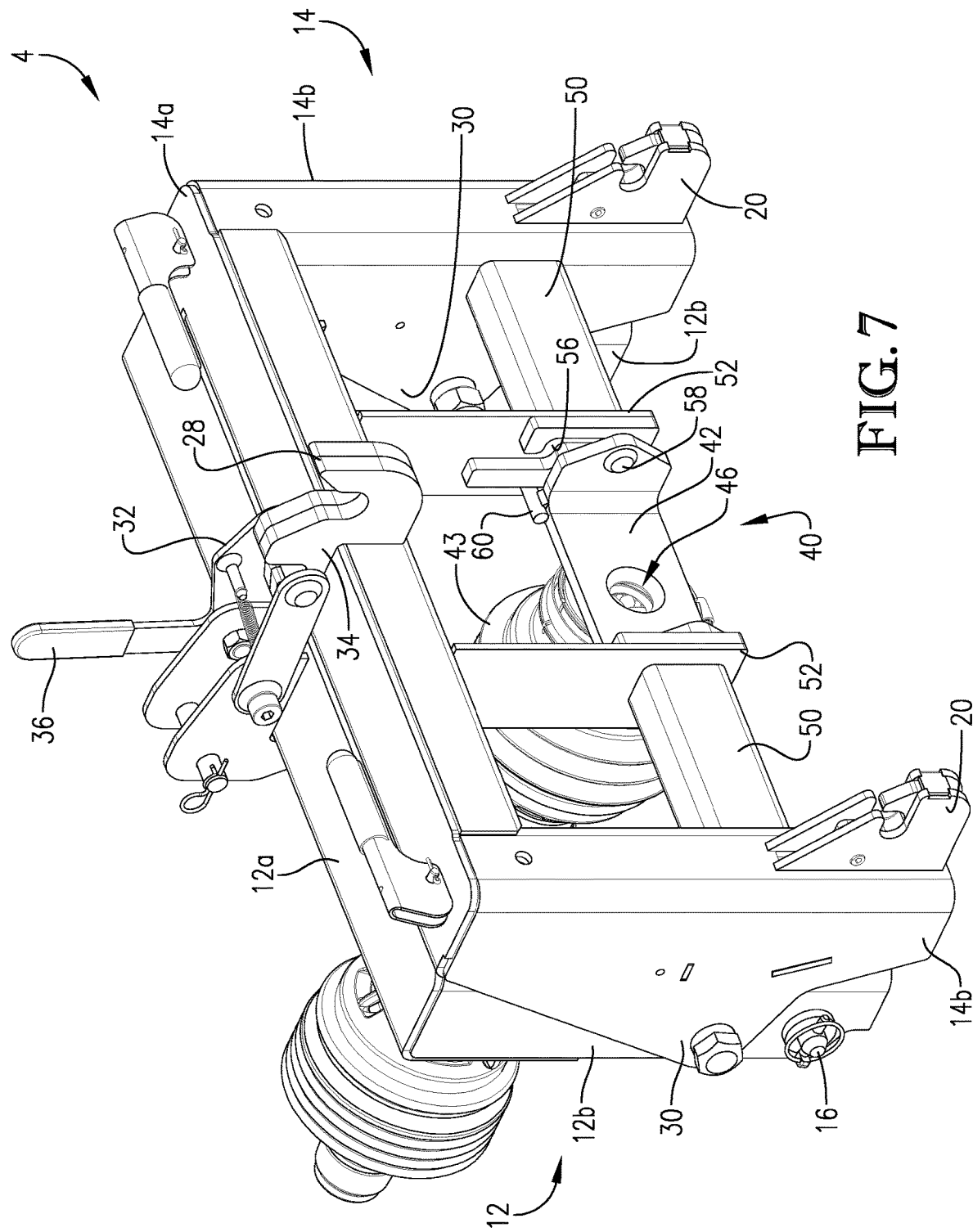
FIG. 7 is a rear perspective view of the attachment assembly from FIGS. 5 and 6.
Figure 8:
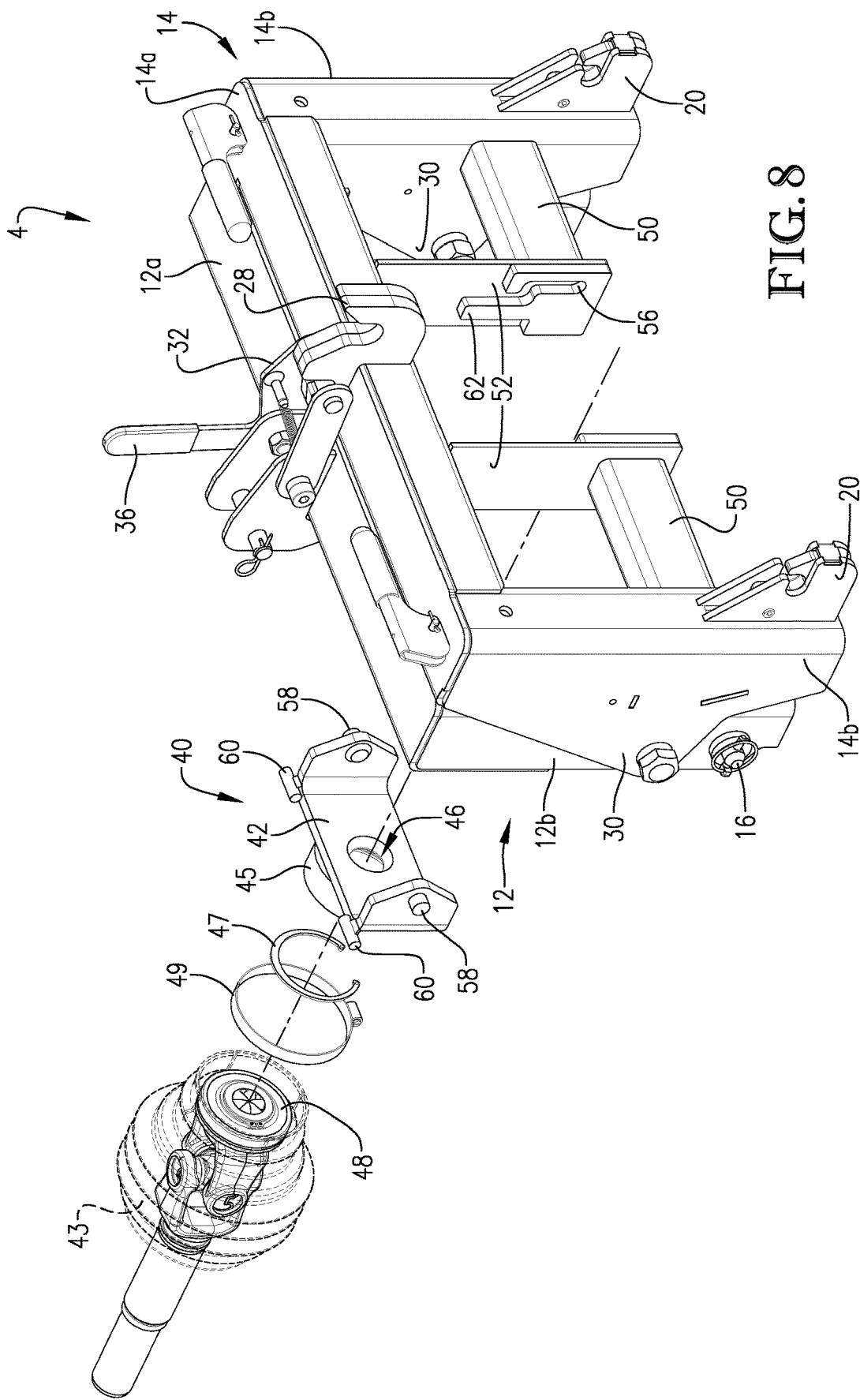
FIG. 8 is a rear perspective view of the attachment assembly from FIG. 7, with the PTO connection assembly of the tractor and the PTO adapter of the attachment assembly shown separated from remaining components of the attachment assembly.
Figure 9A:
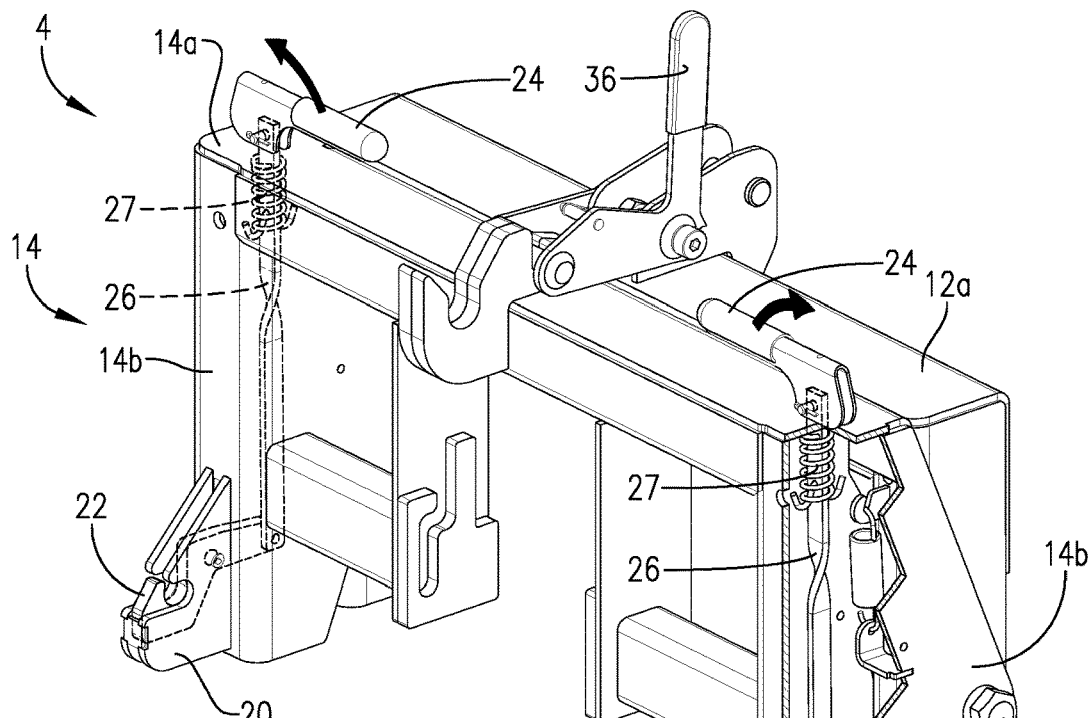
FIG. 9A is a rear perspective view of the attachment assembly from FIGS. 5-8, with a portion of the attachment assembly cut away to show an implement release assembly in a locked configuration.
Figure 9B:
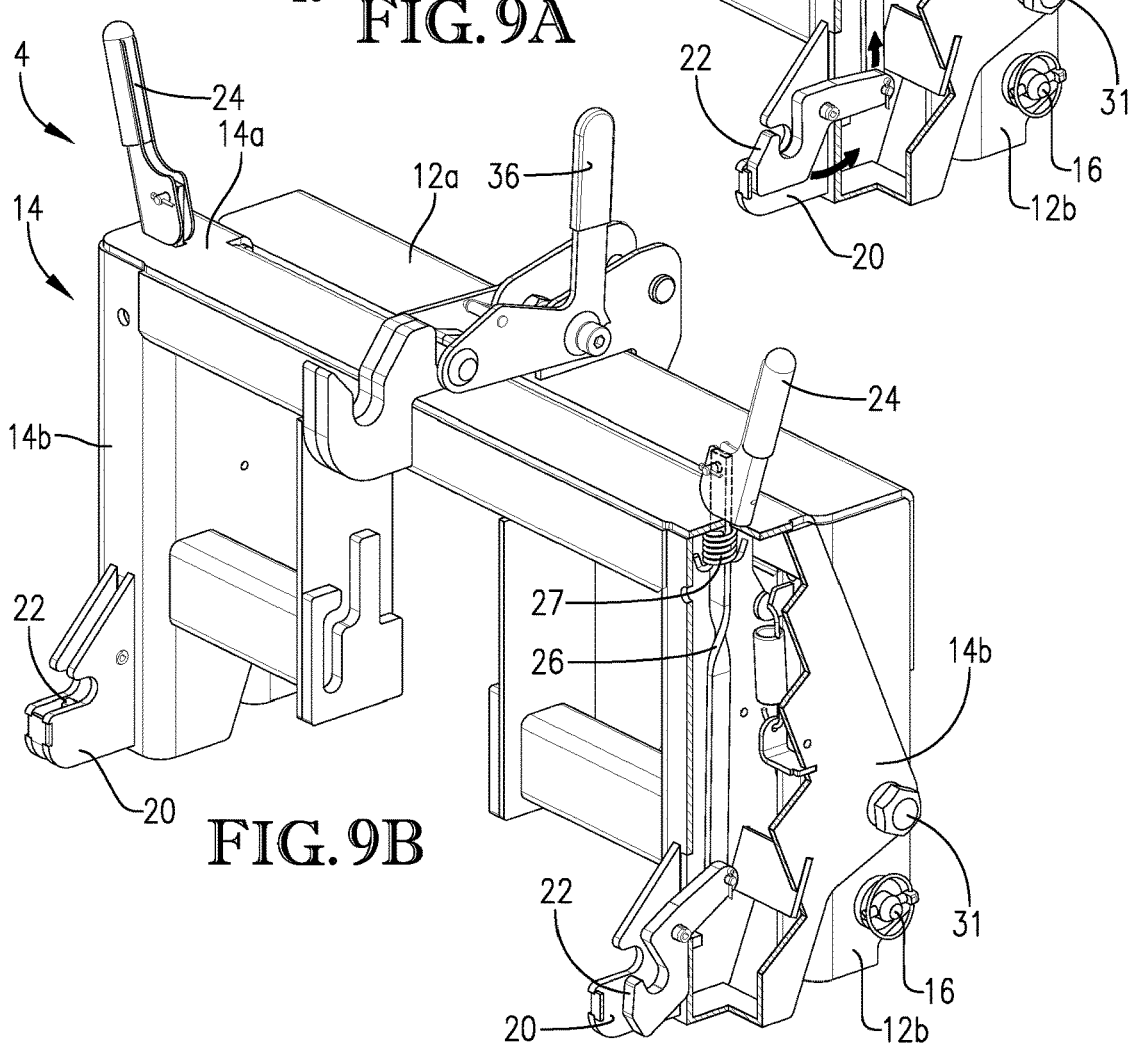
FIG. 9B is a rear perspective view of the attachment assembly from FIG. 9A, with the implement release assembly in an unlocked configuration.

Turning to the implement-side frame 14, as perhaps best shown in FIGS. 7 and 8, each of the side bars 14b may include a lower engagement hook 20 extending rearward from a lower portion of the side bar 14b. The lower engagement hooks 20 each include a receiving groove that is configured to receive a lower hitch pin 21 of the implement 6, as shown in FIGS. 1-4. The implement-side frame 14 may provide for the lower engagement hooks 20 to be associated with an implement release assembly for selectively securing the lower hitch pins 21 of the implement 6 within the lower engagement hooks 20. In more detail and with reference to FIGS. 9A and 9B, the implement release assembly may include, for each lower engagement hook 20, an implement latch element 22 selectively configurable in a locked position (See, e.g., FIG. 9A) and an unlocked position (See, e.g., FIG. 9B). In the locked position, the implement latch element 22 is positioned directly rearward of the receiving groove of the lower engagement hook 20, thereby blocking the receiving groove so as to prevent the lower hitch pin 21 of the implement 6 from being extracted from the lower engagement hook 20. In the unlocked position, the implement latch element 22 is moved downward so as to unblock the receiving groove of the lower engagement hook 20, thereby permitting the lower hitch pin 21 of the implement 6 to be freely extracted from the lower engagement hook 20.

The implement latch elements 22 may each be transitioned between locked and unlocked positions (and vice-versa) via a pair of implement release levers 24 pivotally coupled to a top panel of the upper bar 14a of the implement-side frame 14. Each implement release lever 24 may be coupled to one of the implement latch elements 22 via a linkage assembly 26 extending from the implement release lever 24, downward through an interior space presented by the associated side bar 14b, and to the implement latch element 22. As such, the implement release levers 24 can be actuated by the hand of an operator to a raised, unlocked position (See, e.g., FIG. 9B) to unlock the implement latch elements 22, and can be actuated to a lowered, locked position (See, e.g., FIG. 9A) to lock the implement latch elements 22. In some embodiments, a cable assembly (not shown) may be used in place of the illustrated linkage assembly 26. Such a cable assembly may include flexible cables or chains that engage with the implement latch elements 22, such that actuation of the cables can lock and unlock the implement latch elements 22. In some embodiments, the cables may be actuated via an actuation assembly (e.g., a winch) that permits the operator of the tractor to control actuation of the cables while sitting in the operating seat of the tractor 8. Alternatively, the cables may extend between the implement release levers 24 and the implement latch elements 22, such that actuation of the implement release levers 24 can lock and unlock the implement latch elements 22. As may be required, the cable assembly may additionally include one or more pulleys, rollers, and/or other components necessary for implementation and operation.

It should be noted that even in the locked positions, the implement latch elements 22 may still permit the lower hitch pins 21 of the implement 6 to be inserted into the lower engagement hooks 20. In more detail, as perhaps best shown in FIG. 9A, the rear-facing sides of the implement latch elements 22 may be formed with an upwardly-angled surface. As such, when a lower hitch pin 21 of the implement 6 comes into contact with the rear-facing side of the implement latch element 22 in the locked position (e.g., when a lower hitch pin 21 is being inserted within the lower engagement hook 20 while the implement latch element 22 is blocking the receiving groove), the lower hitch pin 21 can nevertheless force the implement latch element 22 downward to so as to unblock the receiving groove to permit the lower hitch pin 21 to be received within the lower engagement hook 20. Upon the lower hitch pin 21 being inserted into the lower engagement hook 20, the implement latch element 22 may be automatically actuated upward, back to the original locked position, so as to inhibit the lower hitch pin 21 from being removed from the lower engagement hook 20. Such actuation of the implement latch element 22 upward to the locked position may be facilitated by a biasing element 27, such as a spring, which may form part of the linkage assembly 26. In some embodiments, each of the linkage assemblies 26 may include a biasing element 27, so as to bias each of the implement latch elements 22 in the locked position.

Figure 2:
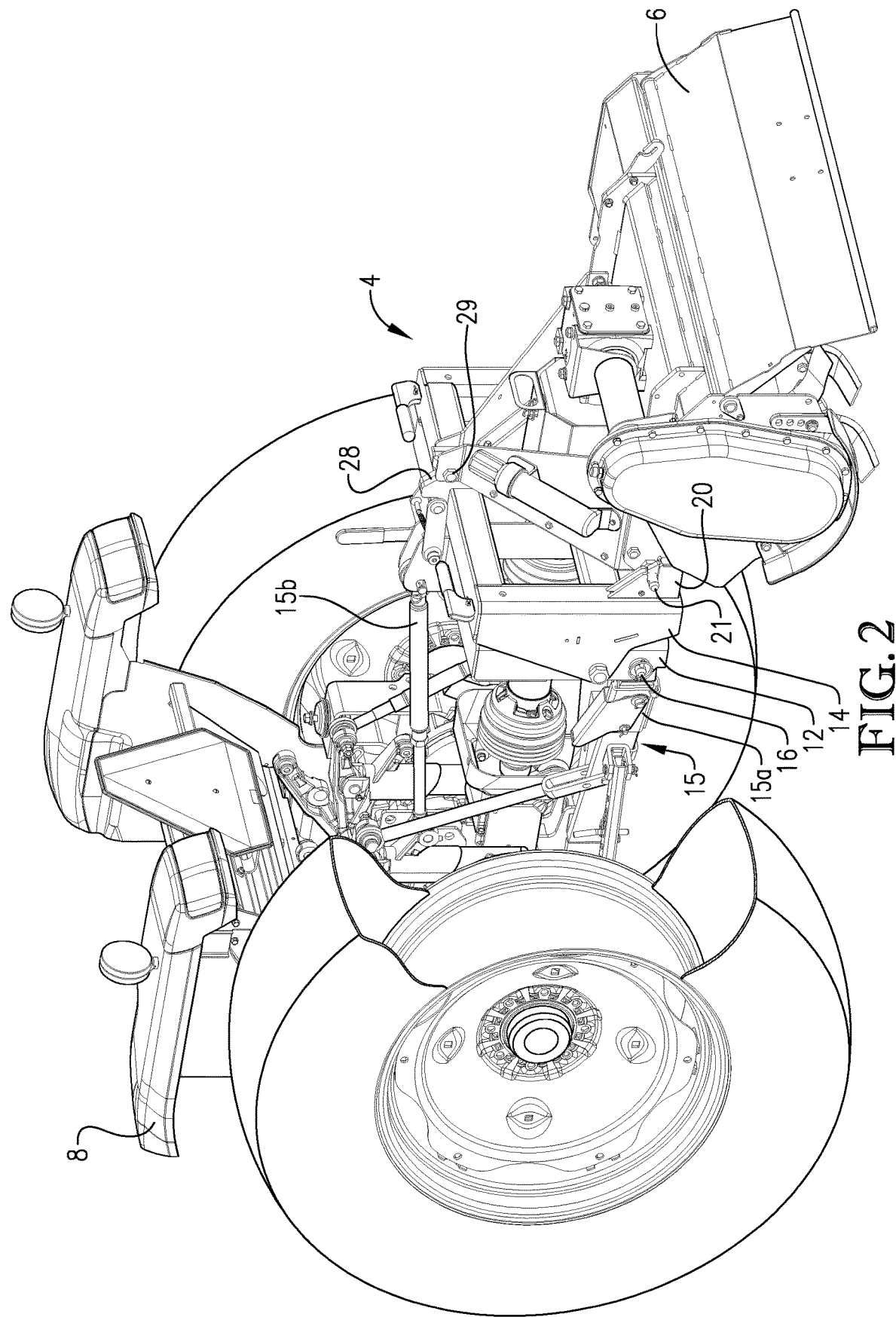
FIG. 2 is a left, rear perspective view of the implement secured to the tractor via the attachment assembly from FIG. 1.
Figure 3:
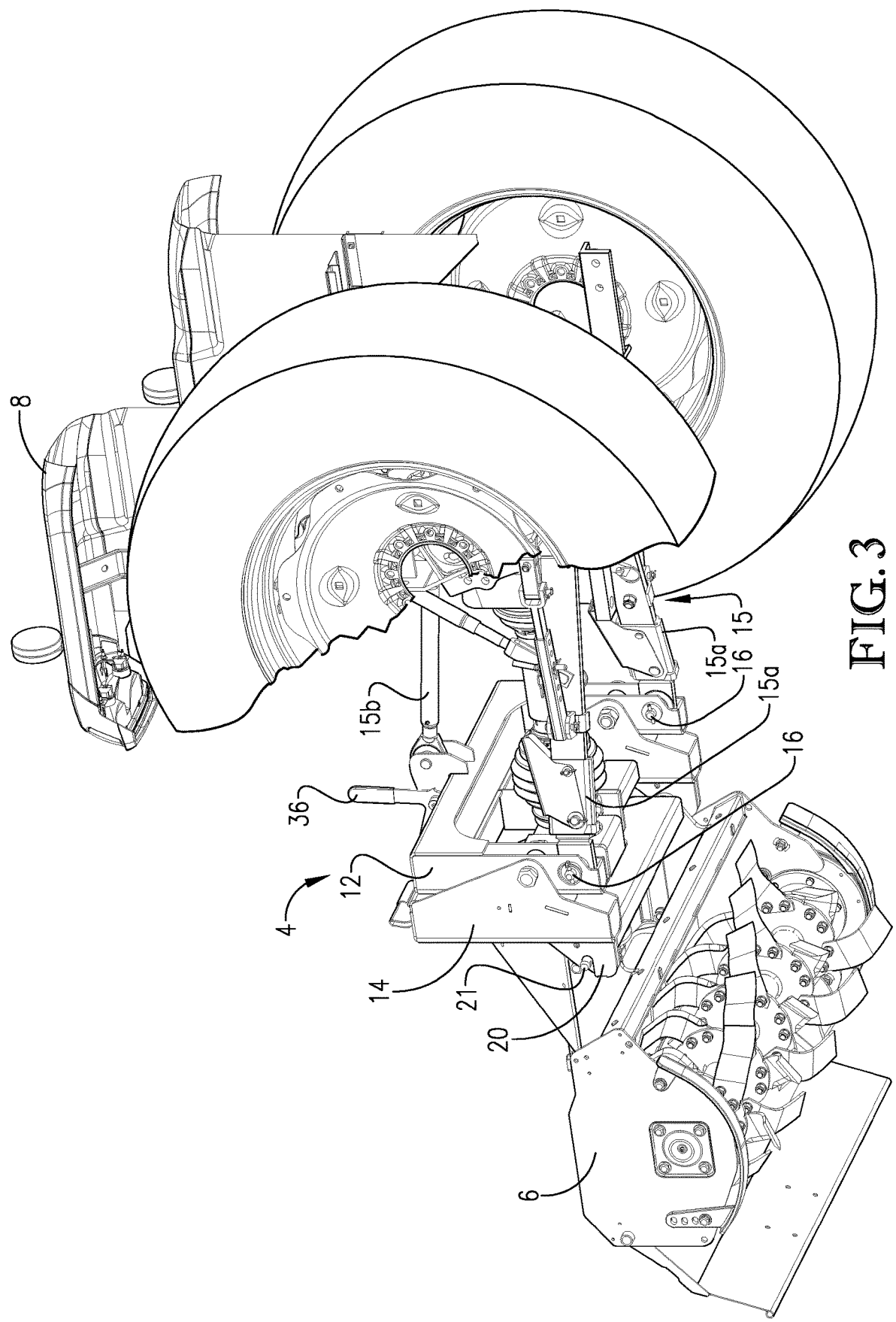
FIG. 3 is a right, lower perspective view of the implement secured to the tractor via the attachment assembly from FIGS. 1 and 2, with a portion of the tractor cut away to better illustrate the attachment assembly.
Figure 4:
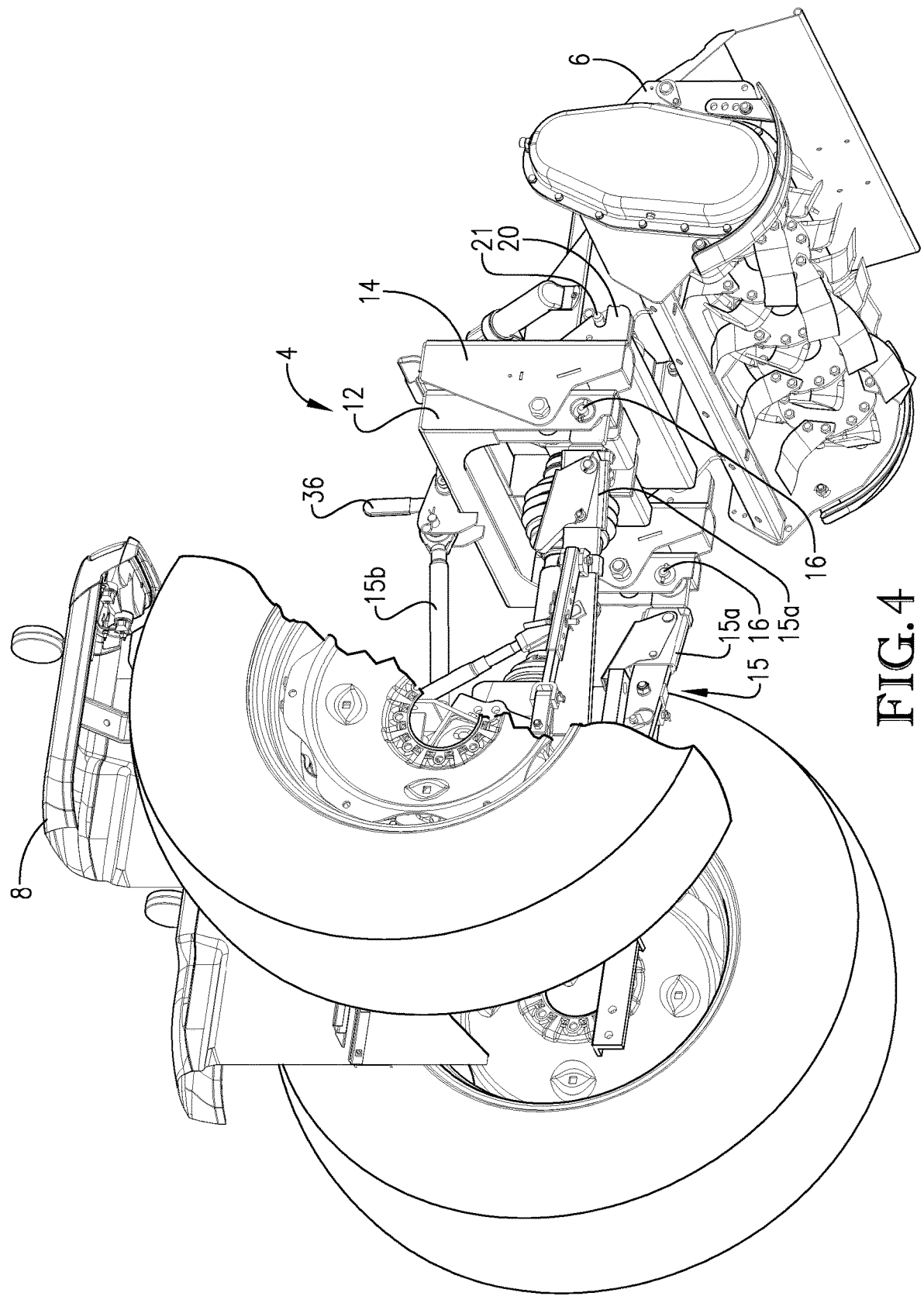
FIG. 4 is a left, lower perspective view of the implement secured to the tractor via the attachment assembly from FIGS. 1-3, with a portion of the tractor cut away to better illustrate the attachment assembly.

Returning to FIGS. 7 and 8, the implement-side frame 14 may additionally include an upper engagement hook 28, which extends upward and/or rearward from the upper bar 14a of the implement-side frame 14. The upper engagement hook 28 may be positioned near a center of the upper bar 14a so as to be configured to receive an upper hitch pin 29 of the implement 6, as illustrated in FIGS. 1 and 2.

Figure 10:
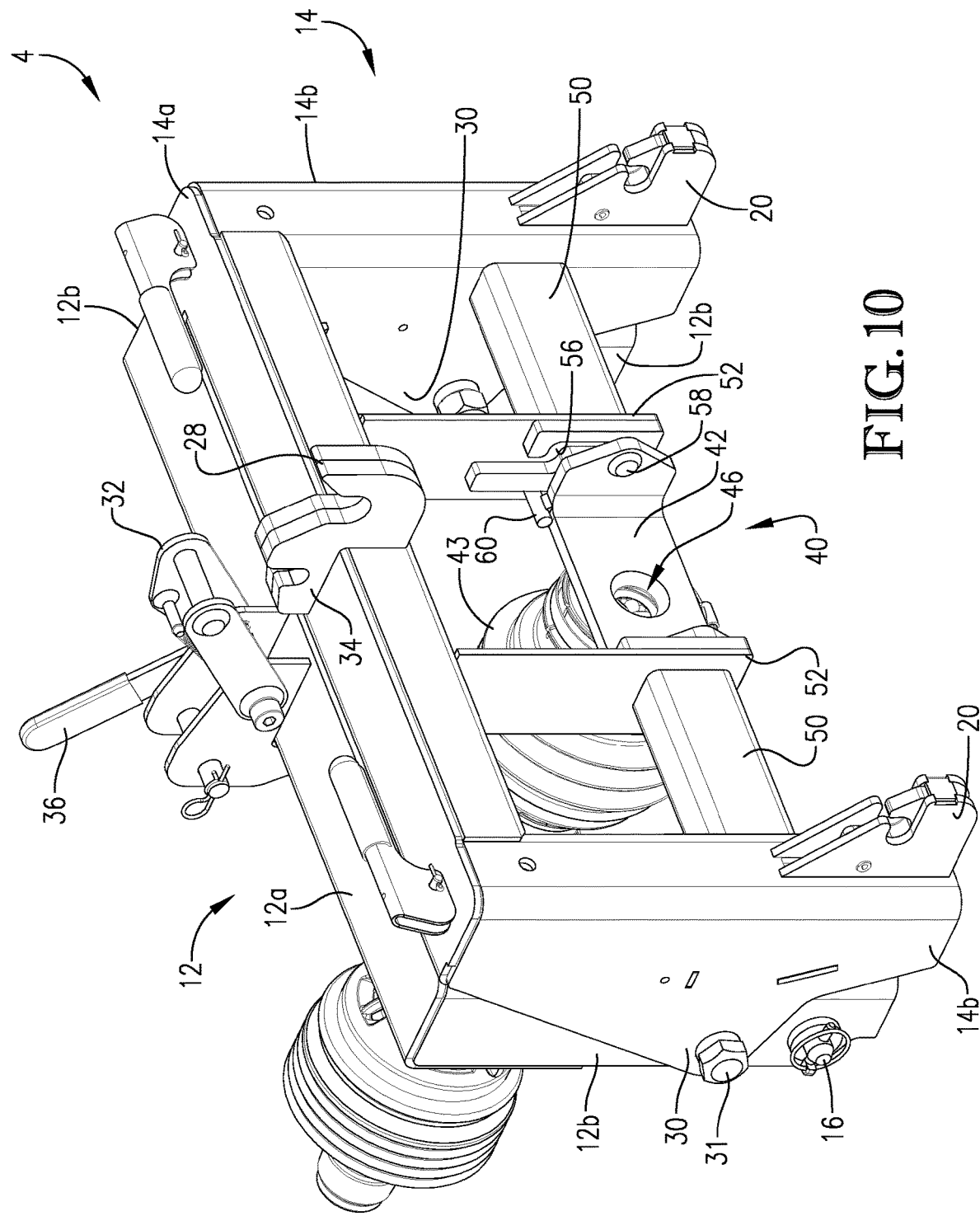
FIG. 10 is a rear perspective view of the attachment assembly from FIGS. 5-8, with a frame release assembly illustrated in an unlocked position.
Figure 11:
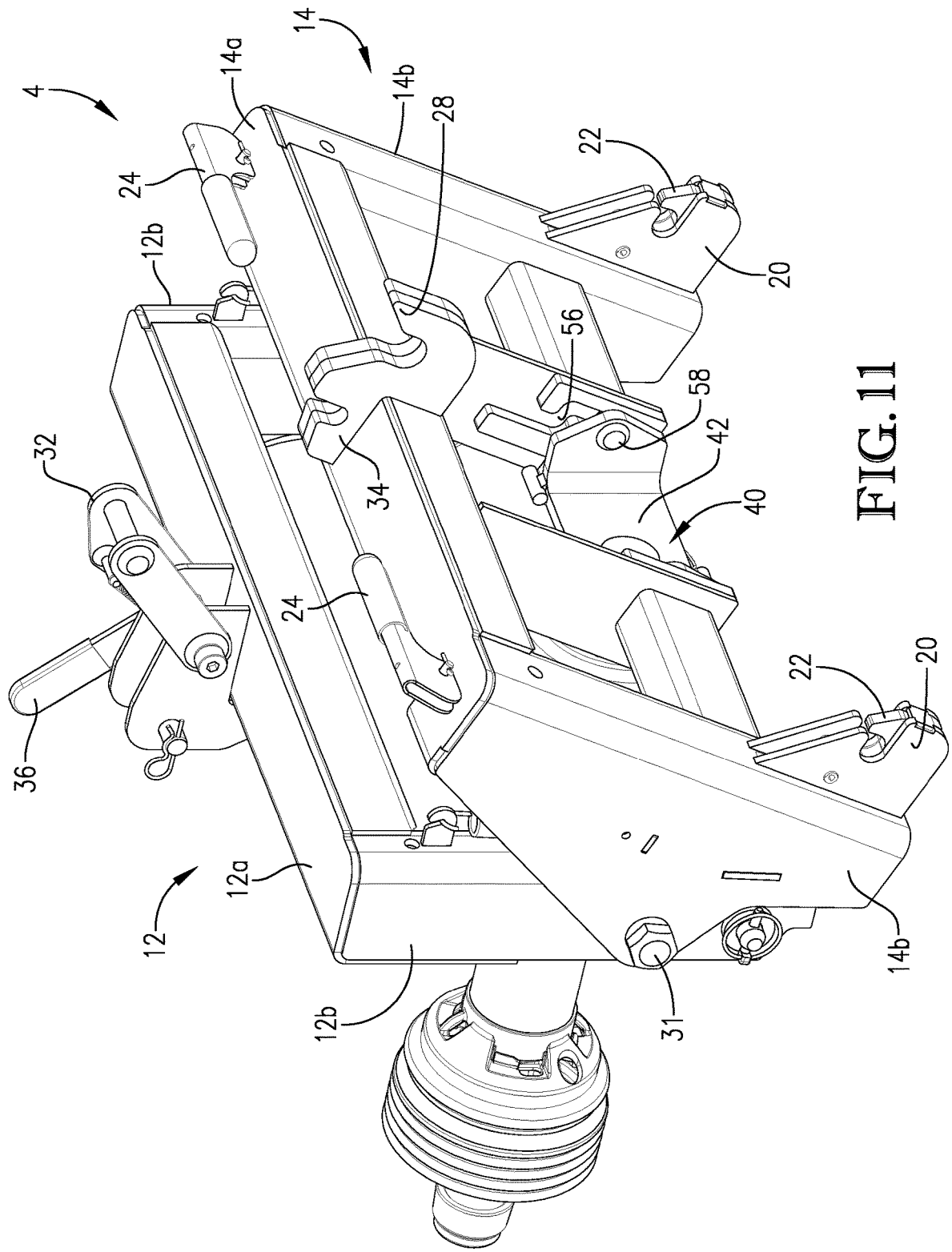
FIG. 11 is a rear perspective view of the attachment assembly from FIG. 10, with the frame release assembly in the unlocked position and the attachment assembly illustrated in an open configuration.

In some embodiments, the implement-side frame 14 may be pivotably secured to the tractor-side frame 12. As such, the implement-side frame 14 can pivot from a position adjacent to the tractor-side frame 12 (i.e., such that the attachment assembly 4 is in a closed configuration), to a position in which the implement-side frame 14 is rotated away from the tractor-side frame 12 (i.e., such that the attachment assembly 4 is in an open configuration). FIG. 7 illustrates the attachment assembly 4 in the closed configuration. FIG. 10 illustrates the attachment assembly 4 being unlocked, such that the attachment assembly 4 can be transitioned from the closed configuration to the open configuration. FIG. 11 illustrates the attachment assembly 4 in the open configuration.

In more detail, and as perhaps best shown in FIGS. 5-8, each of the side bars 14b of the implement-side frame 14 may be formed with a pair of parallel pivot support plates 30 that extend rearward toward side bars 12b of the tractor-side frame 12. The pivot support plates 30 may, in some embodiments, form side panels of the side bars 14b. Each pair of pivot support plates 30 may be spaced apart a sufficient distance so as to receive one of the side bars 12b of the tractor-side frame 12 therebetween (See FIGS. 5 and 6). As such, a support pin 31 may extend between each pair of pivot support plates 30 and the corresponding side bar 12b so as to secure the implement-side frame 14 to the tractor-side frame 12 in a pivotable manner. Specifically, the support pins 31 may present an axis about which the implement-side frame 14 can pivot or rotate with respect to the tractor-side frame 12 (e.g., between the closed and open configurations).

For example, as shown in FIG. 7, the attachment assembly 4 is in the closed configuration, with the implement-side frame 14 positioned adjacent to the tractor-side frame 12, and with both the implement-side frame 14 and the tractor-side frame 12 oriented generally parallel with each other (e.g., each being orientated generally vertically). In contrast, as shown in FIG. 11, the attachment assembly 4 is in the open configuration, with the implement-side frame 14 (or at least an upper portion of the implement-side frame 14) rotated rearward, away from the tractor-side frame 12, such that the implement-side frame 14 is oriented at an angle with respect to the tractor-side frame 12. In some embodiments, the angle may be between 5 and 60 degrees, between 10 and 50 degrees, about 20 degrees, about 30 degrees, or about 45 degrees.

Certain embodiments may provide for the attachment assembly 4 to be securely maintained in the closed configuration. For example, as shown in FIGS. 7, 10, and 11, the attachment assembly 4 may include a frame release assembly that includes a frame latch element 32 extending from the upper bar 12a of the tractor-side frame 12. In some embodiments, the frame latch element 32 may be rotatably secured to the securing plates 19, which were previously described. The frame latch element 32 may be configured to be selectively received within a frame hook element 34 (which may also form part of the frame release assembly) extending from the upper bar 14a of the implement-side frame 14. In some embodiments, the frame hook element 34 may be formed from the same piece of material as the upper engagement hook 28. Nevertheless, the frame release assembly may additionally include a frame release lever 36, which is rigidly secured to the frame latch element 32, and which can be used to actuate the frame latch element 32 (1) into engagement with the frame hook element 34 so as to lock the attachment assembly 4 in the closed configuration (i.e., with the implement-side frame 14 locked in a position adjacent to the tractor-side frame 12), or (2) out of engagement with the frame hook element 34 so as to unlock the attachment assembly 4 to permit the implement-side frame 14 to rotate away (e.g., rearward) from the tractor-side frame 12 such that the attachment assembly 4 is in the open configuration. As noted previously, FIG. 7 illustrates the frame release assembly in the locked position, with the attachment assembly 4 being securely locked in the closed configuration. FIG. 10 illustrates the frame release assembly in the unlocked position, such that the attachment assembly 4 is free to shift from the closed configuration to the open configuration. FIG. 11 illustrates the frame release assembly in the unlocked position, with the attachment assembly 4 having been shifted to the open configuration In certain embodiments, the attachment assembly 4 will additionally include a PTO adapter 40, as shown in FIGS. 6-8, which can be used to facilitate connection between the PTO drive system of the tractor 8 with the PTO receiving system of the implement 6. In more detail, the PTO adapter 40 may include an adapter plate 42 configured to securely receive a PTO connection assembly 43 from the PTO drive system of the tractor 8 and to facilitate connection with a PTO driveline 44 from the PTO receiving system of the implement 6 (See FIG. 12 for an illustration of the tractor's 8 PTO connection assembly 43 and the implement's 6 PTO driveline 44). In more detail, as perhaps best shown in FIG. 6, the PTO adapter 40 may include an adapter cup 45 extending forward from the adapter plate 42. The adapter cup 45 may be concentrically aligned with an opening 46 that extends through the adapter plate 42.

Embodiments may provide for the PTO connection assembly 43 of the tractor 8 to be secured to the attachment assembly 4 via securement to the adapter plate 42. In some embodiments, the PTO connection assembly 43 of the tractor 8 may include one or more extension components that extend rearward from the tractor's 8 PTO stub. Although the PTO stub is not shown in the drawings, the PTO connection assembly 43 is illustrated generally extending from the tractor 8 in FIG. 12. A distal end of the PTO connection assembly 43 may be secured to the adapter plate 42 via connection with the adapter cup 45, as is shown in FIG. 5. The PTO connection assembly 43 may be securely held in place in or on the adapter cup 45 via a snap ring 47 or other similar mechanism, as shown in FIGS. 5, 6, and 8. In addition, a cover of the PTO connection assembly 43 may be secured to the adapter cup 45 via a clasp 49. As perhaps best shown in FIG. 8, the distal end of the PTO connection assembly 43 may include a U-joint 48 with a female mating portion (e.g., a receiving opening) directed towards the attachment assembly 4 when the PTO connection assembly 43 is secured to the PTO adapter 40. The female mating portion of the U-joint 48 may be aligned with the opening 46 of the adapter plate 42, as illustrated in FIG. 6, such that, as will be described in more detail below, the PTO driveline 44 of the implement 6 can be inserted through the opening 46 of the PTO adapter 40 and into engagement with the U-joint 48 of the PTO connection assembly 43 of the tractor 8. Thus, the PTO receiving system of the implement 6 can be connected with the PTO drive system of the tractor 8, such that the implement 6 can receive rotary power from the tractor 8.

As shown in FIGS. 6-8, the PTO adapter 40 may, in some embodiments, be secured to the implement-side frame 14 via a pair of lateral supports 50 that extend inward from the side bars 14*b*, and a pair of vertical supports 52 that extend downward from the upper bar 14*a*. The lateral supports 50 may extend inwards such that free ends of the lateral supports 50 are spaced apart a sufficient distance to receive the PTO adapter 40 therebetween. In some embodiments, the vertical supports 52 may extend downward over the free ends of the lateral supports 50, yet may remain spaced apart a sufficient distance to receive the PTO adapter 40 therebetween. Specifically, inner surfaces of each of the lateral supports 50 and/or the vertical supports 52 may include receiving notches 56 (See FIGS. 6 and 8) configured to receive protrusions 58 that extend laterally from the lateral sides of the adapter plate 42. Thus, the PTO adapter 40 can be selectively engaged with the implement-side frame 14 by inserting (e.g., by sliding) the protrusions 58 of the PTO adapter 40 within the receiving notches 56 formed in the lateral supports 50 and/or the vertical supports 52, as is shown in FIG. 7. In such a position, the PTO adapter 40 will generally be orientated in alignment with the implement-side frame 14 (e.g., the PTO adapter 40 and the implement-side frame 14 will each be orientated generally vertically).

In certain additional embodiments, the PTO adapter 40 and the implement-side frame 14 may be configured to rotate with respect to each other. For instance, the PTO adapter 40 may be configured to at least partly rotate out of alignment with the implement-side frame 14 (e.g., via the engagement of the protrusions 58 within the receiving notches 56). Specifically, with the protrusions 58 of the PTO adapter 40 received with the receiving notches 56 formed in the lateral supports 50 and/or the vertical supports 52, the PTO adapter 40 may rotate forward (i.e., toward the tractor-side frame 12, as illustrated in FIG. 11). Such rotation may permit, as will be discussed in more detail below, the PTO connection assembly 43 of the tractor 8 to remain connected with the PTO driveline 44 of the implement 6 even when the implement-side frame 14 rotates forward away from the tractor-side frame 12 (i.e., when the attachment assembly 4 is positioned in an open configuration as shown in FIG. 11). Thus, the PTO adapter 40 may remain generally vertically orientated, while the implement-side frame 14 is rotated forward, so as to maintain proper connection with the PTO connection assembly 43. In some embodiments, the PTO adapter 40 may include a pair of stop protrusions 60, as illustrated in FIGS. 6-8, that extend laterally from the adapter plate 42. Such stop protrusions 60 may be configured to engage with a stop surface 62 formed on the lateral supports 50 and/or the vertical supports 52 so as to prevent the adapter plate 42 from rotating too far rearward (e.g., rearward beyond alignment with the implement-side frame 14).

To facilitate connection of various sizes of PTO drive systems, the attachment assembly 4 may include multiple PTO adapters 40, each being formed with various sized adapter cups 45 and/or adapter openings 46. The various PTO adapters 40 can be selectively removed from and inserted into the implement-side frame 14 by, respectively, removing and inserting the protrusions 58 of the PTO adapters 40 within the receiving notches 56 formed in the lateral supports 50 and/or the vertical supports 52.

In operation, the attachment assembly 4 can be used to quickly and efficiently operably connect an implement 6 to a tractor 8. Beneficially, as noted above, the attachment assembly 4 is configured to connect the PTO drive system of the tractor 8 with the PTO receiving system of the implement 6, such that the tractor 8 can provide rotary power to the implement 6. In more detail, the attachment assembly 4 will be secured to the tractor 8 by connecting the tractor-side frame 12 of the attachment assembly 4 to the three-point hitch 15 of the tractor 8. Specifically, as shown in FIGS. 1-4 and 12, the lifting arms 15*a* of the three-point hitch 15 can be inserted into the bases of the side bars 12*b*, as was previously described, and secured to the side bars 12*b* via the lower hitch pins 16. In addition, the upper bar 12*a* of the tractor-side frame 12 may be secured to the upper link 15*b* of the three-point hitch 15 by inserting the upper hitch pin 18 simultaneously through the parallel securing plates 19 of the attachment assembly 4 and the upper link 15*b* of the three-point hitch 15. As was noted previously, however, in certain embodiments, the attachment assembly 4 may be permanently secured to and/or integrated with the tractor 8. For example, the tractor-side frame 12 may be permanently secured to and/or may form part of the rear end of the tractor 8, such that the attachment assembly 4 extends rearward from the rear end of the tractor 8. Finally, the PTO connection assembly 43 of the tractor's 8 PTO drive system will be engaged with the PTO adapter 40 of the attachment assembly 4, as was described previously. Specifically, as shown in FIG. 5, a distal end of the PTO connection assembly 43 will be securely engaged with the PTO adapter cup 45 engaged with the implement-side frame 14. In such a configuration, the female mating portion of the PTO connection assembly's 43 U-joint 48 will be aligned with the opening 46 formed through the adapter plate 42 of the PTO adapter 40 (See FIGS. 7 and 8).

Figure 12:
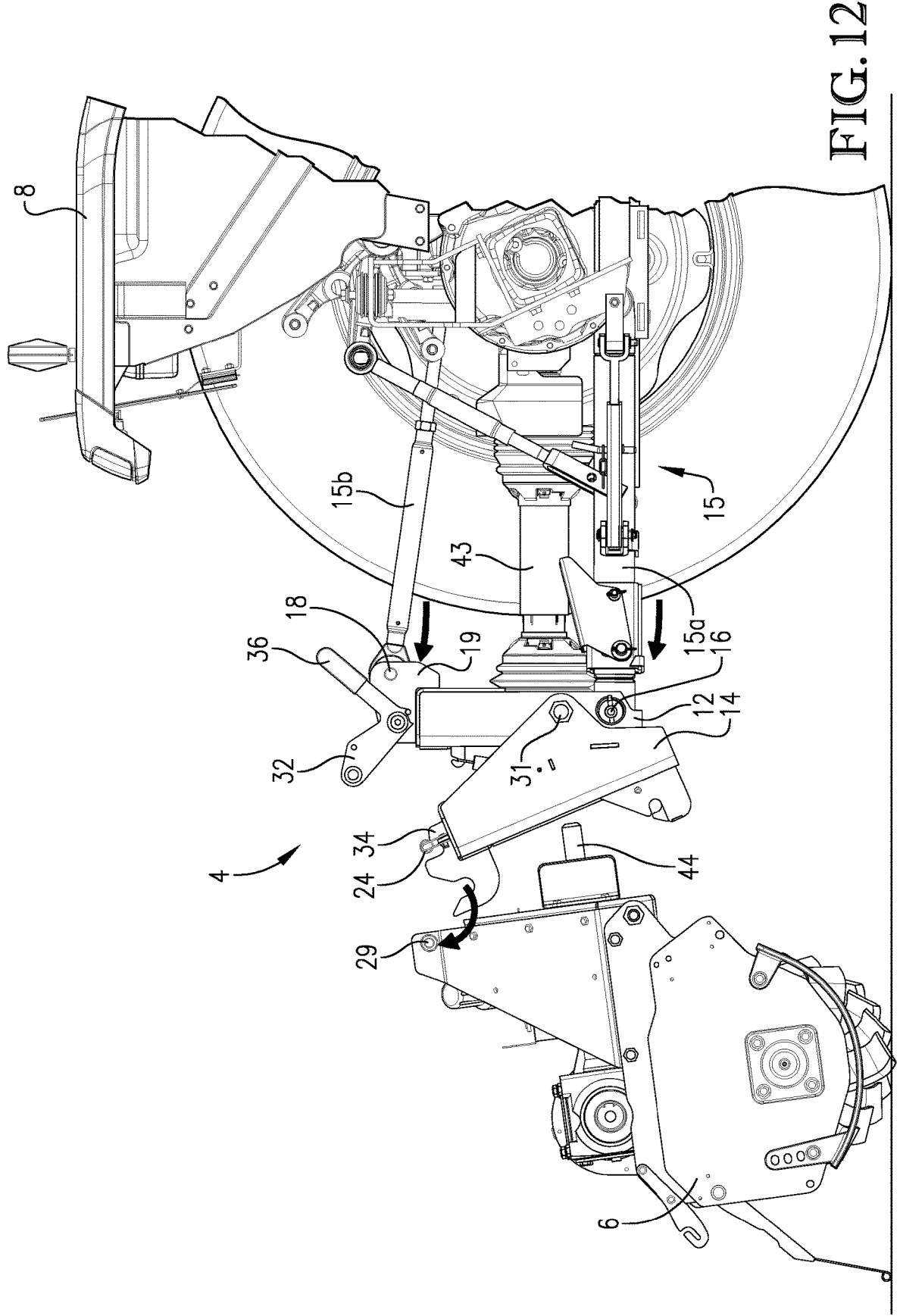
FIG. 12 is a side elevation view of an attachment assembly according to embodiments of the present invention being shown secured to a tractor and engaging with an implement.

In general use, the attachment assembly 4 may be secured to the tractor 8 with the attachment assembly 4 being in the closed configuration (i.e., with the implement-side frame 14 secured in position adjacent to the tractor-side frame 12 via the frame release assembly). However, in some embodiments, the attachment assembly 4 may be secured to the tractor 8 while in the open configuration. Nevertheless, to secure an implement 6 to the tractor 8 via the attachment assembly 4, the attachment assembly 4 is generally required to be shifted to the open configuration, as illustrated in FIG. 12. To accomplish such shifting, an operator of the tractor 8 may actuate the frame release lever 36 such that the frame latch element 32 of the tractor-side frame 12 is released from the frame hook element 34 on the implement-side frame 14. Beneficially, due to the position of the frame release lever 36 being positioned on the top bar 12a of the tractor-side frame 12 of the attachment assembly 4, actuation of the frame release lever 36 can be performed by the operator of the tractor 8 while the operator remains positioned on the tractor 8 (e.g., while sitting in the operating seat or while standing adjacent the operating seat of the tractor 8). As such, the operator may not be required to step off or down from the tractor 8 to perform the various method steps described herein.

Due to the release of the frame release assembly, the implement-side frame 14 can be rotated rearwardly, or can fall rearward under its own weight, away from the tractor-side frame 12, as is shown in FIG. 12. Specifically, the implement-side frame 14 can rotate rearwardly about the support pins 31 that secure the pivot support plates 30 of the implement-side frame 14 to the side bars 12b of the tractor-side frame 12, as was previously described and illustrated. Beneficially, because the PTO adapter 40 is configured to rotate with respect to the implement-side frame 14, the implement-side frame 14 can rotate rearwardly away from the tractor-side frame 12 without interfering or otherwise causing problems with the connection between the PTO connection assembly 43 of the tractor 8 and the PTO adapter 40 of the attachment assembly 4 (such rotation of the PTO adapter 40 is illustrated in FIG. 11).

Figure 13:
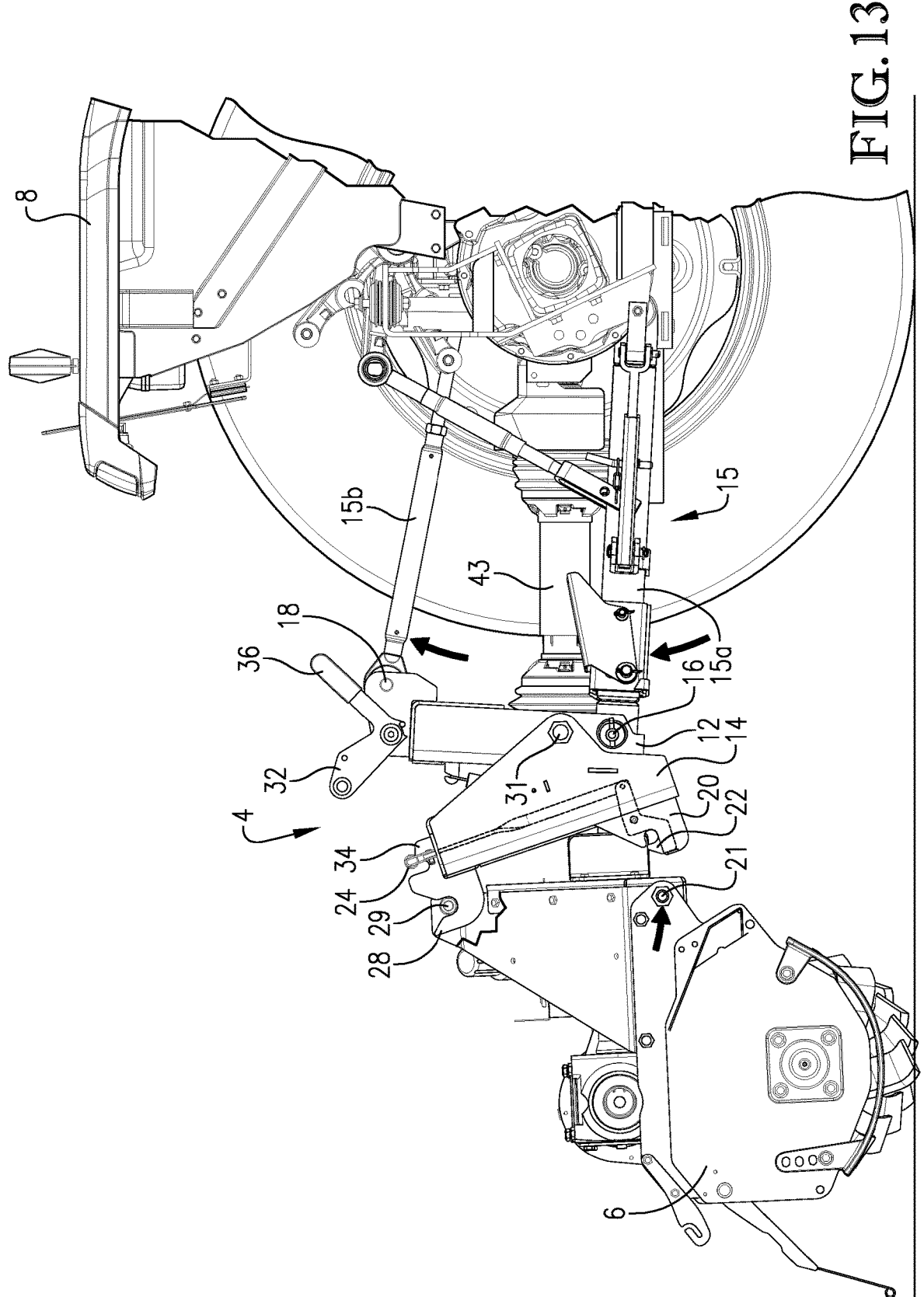
FIG. 13 is a side elevation view of the attachment assembly, the tractor, and the implement from FIG. 12, with an upper portion of the attachment assembly being engaged with and beginning to lift the implement off the ground.
Figure 14:
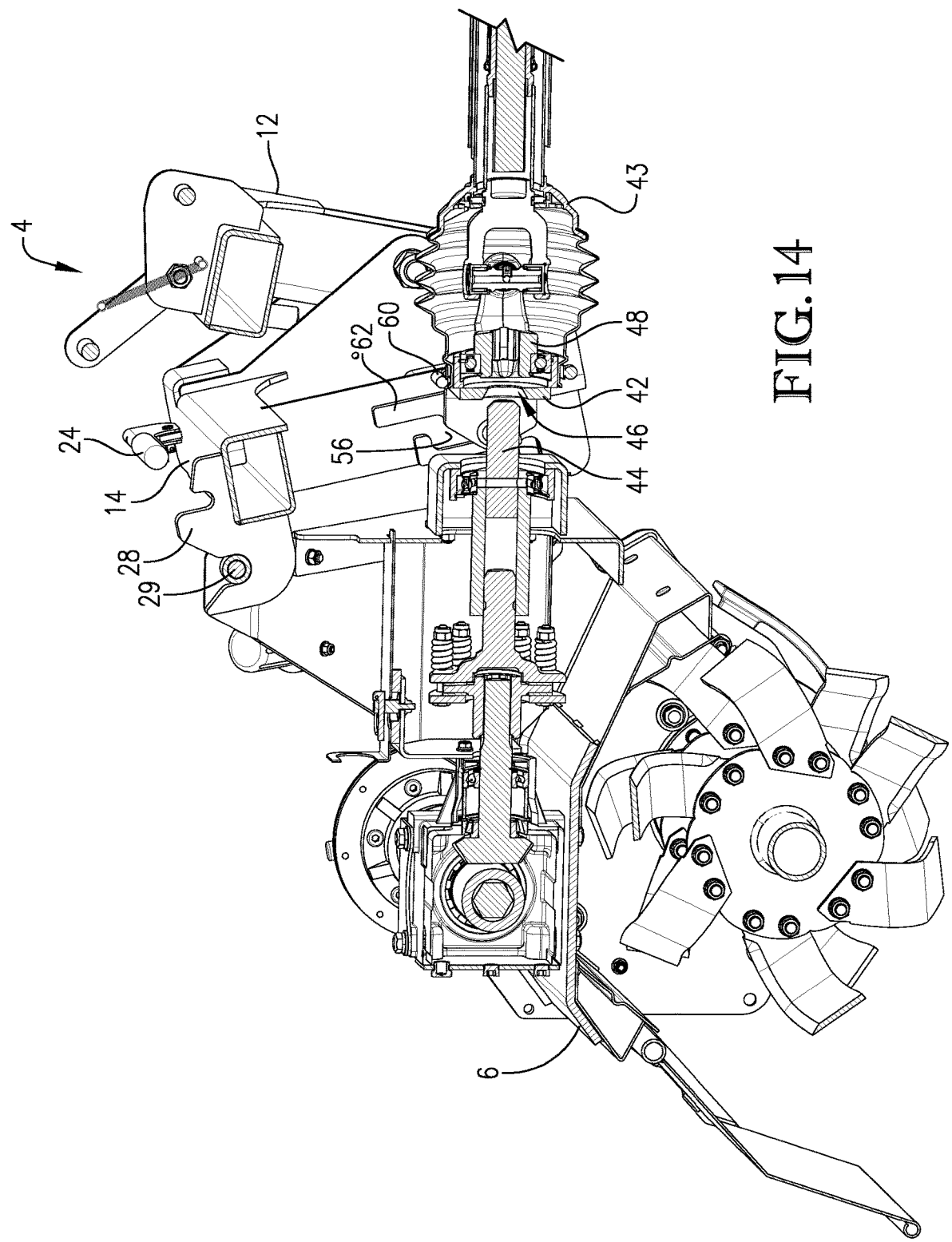
FIG. 14 is a cross-section view of the attachment assembly, a portion of the tractor, and the implement from FIG. 13, illustrating a power-take off (PTO) driveline of the implement being in alignment with the attachment assembly and a PTO connection assembly of the tractor.

As a next step in attaching the attachment assembly 4 to the implement 6, the attachment assembly 4 will be positioned directly in front of the implement 6, with the rear of the implement-side frame 14 facing the implement 6. Such positioning can be performed via maneuvering of the tractor 8. Thereafter, as illustrated in FIG. 13, the attachment assembly 4 can be actuated (e.g., raised by the three-point hitch 15) until the upper engagement hook 28 engages with the upper hitch pin 29 of the implement 6. Simultaneously, the PTO driveline 44 will be aligned with the opening 46 of the PTO adapter 40, such that the PTO driveline 44 can be inserted through the opening 46 and (at least partially) into engagement with the PTO connection assembly 43 extending from the tractor 8, as is shown in FIG. 14. In more detail, the attachment assembly 4 will be actuated vertically (by the three-point hitch 15) and/or horizontally (e.g., via movement of the tractor 8) until the upper engagement hook 28 engages with the upper hitch pin 29 and, simultaneously, the PTO driveline 44 can be aligned with and/or can be at least partially engaged with the PTO connection assembly 43 extending rearward from the tractor 8. Specifically, as shown in FIG. 14, the attachment assembly 4 may begin to be engaged with the implement 6 so as to provide for the PTO driveline 44 to be properly aligned with the opening 46 formed through the PTO adapter 40 and with the U-joint 48 of the tractor's 8 PTO connection assembly 43. It is understood that such engagement between the implement 6 and the attachment assembly 4 may be performed while the attachment assembly 4 is in the open configuration (i.e., with the implement-side frame 14 rotated rearwardly away from the tractor-side frame 12, as is shown in FIG. 13).

Figure 15:
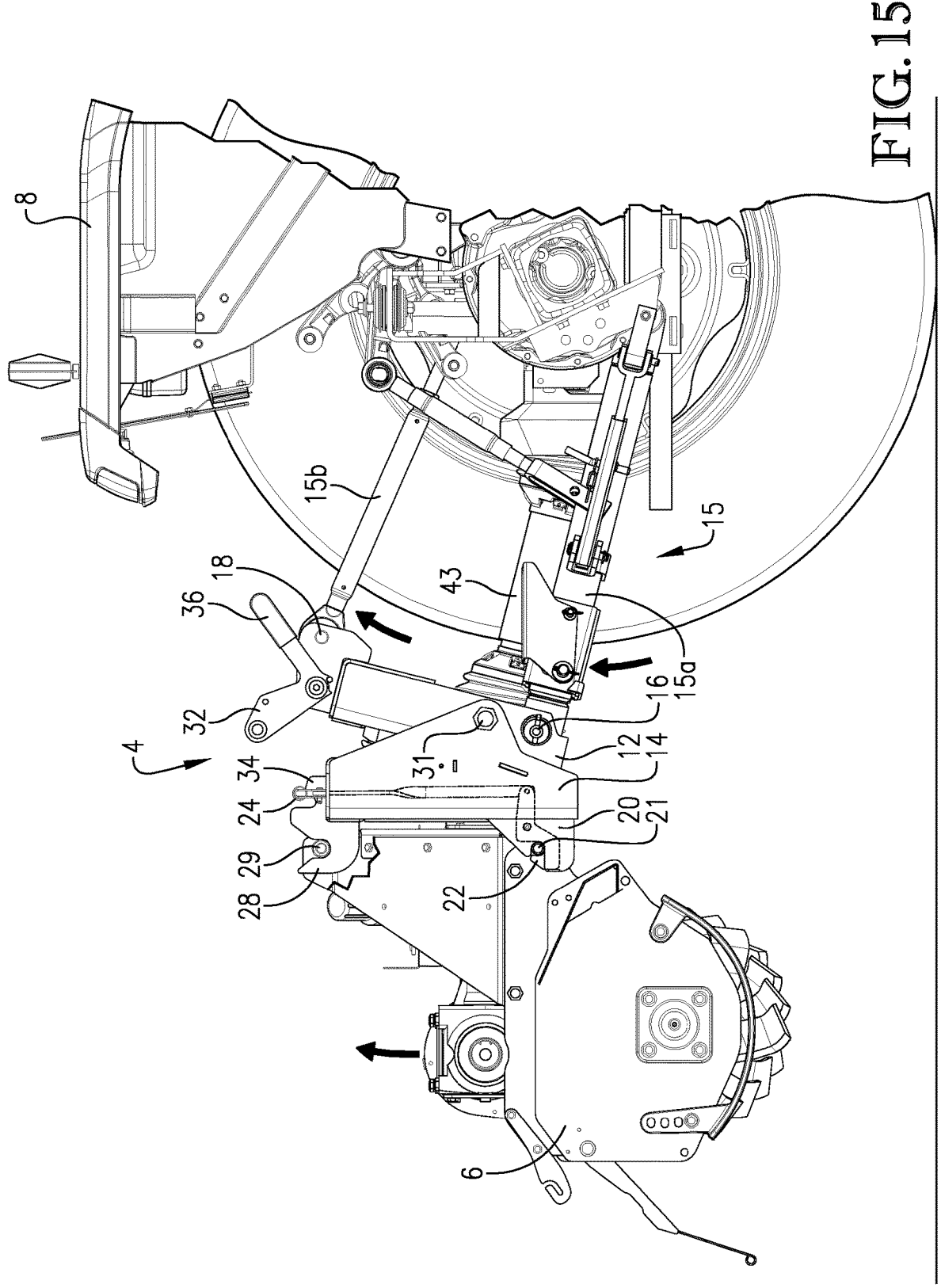
FIG. 15 is a side elevation view of the attachment assembly, the tractor, and the implement from FIGS. 12 and 13, with the implement lifted off the ground such that a lower portion of the implement can be engaged with the attachment assembly.

Next, as illustrated in FIG. 15, the attachment assembly 4 will be raised via the three-point hitch 15 of the tractor 8, so as to lift the implement 6 off the ground by way of the engagement between the upper engagement hook 28 and the upper hitch pin 29 of the implement 6. The lifting of the implement will cause lower portions of the implement 6 to rotate forward (towards the implement-side frame 14) about the upper hitch pin 29, such that the lower hitch pins 21 of the implement 6 are forced into engagement with the lower engagement hooks 20 of the implement-side frame 14. The implement release assembly will be in the locked position (i.e., with the implement release levers 24 in the downward, locked position), such that the implement latch elements 22 will function to securely hold the lower hitch pins 21 of the implement 6 within the lower engagement hooks 20. It should be understood that such locking of the lower hitch pins 21 within the lower engagement hooks 20 can be performed even when the implement release assembly is in the locked configuration. As was described above, the shape of the implement latch elements 22 (and the use of the biasing elements 27 in the linkage assembly 26) permits the lower hitch pins 21 of the implement 6 to be inserted within the lower engagement hooks 20 (and securely held therein) even while the implement release assembly is in the locked configuration. Upon such engagement between the implement 6 and the implement-side frame 14 of the attachment assembly 4, the implement 6 will be securely engaged with upper and lower portions of the attachment assembly 4 via connection between (1) the upper engagement hook 28 of the implement-side frame 14 and the upper hitch pin 29 of the implement 6, and (2) the lower engagement hooks 20 of the implement-side frame 14 and the lower hitch pins 21 of the implement 6.

It should be noted that the complete connection between the implement 6 and the implement-side frame 14 may also require a complete engagement with the PTO driveline 44 of the implement 6 and the PTO connection assembly 43 of the tractor 8. Such connection may require the implement 6 to be lowered to the ground, as illustrated in FIG. 16, such that the attachment assembly 4 can be shifted to the closed configuration and the PTO driveline 44 can be fully engaged within the PTO connection assembly 43.

Figure 16:
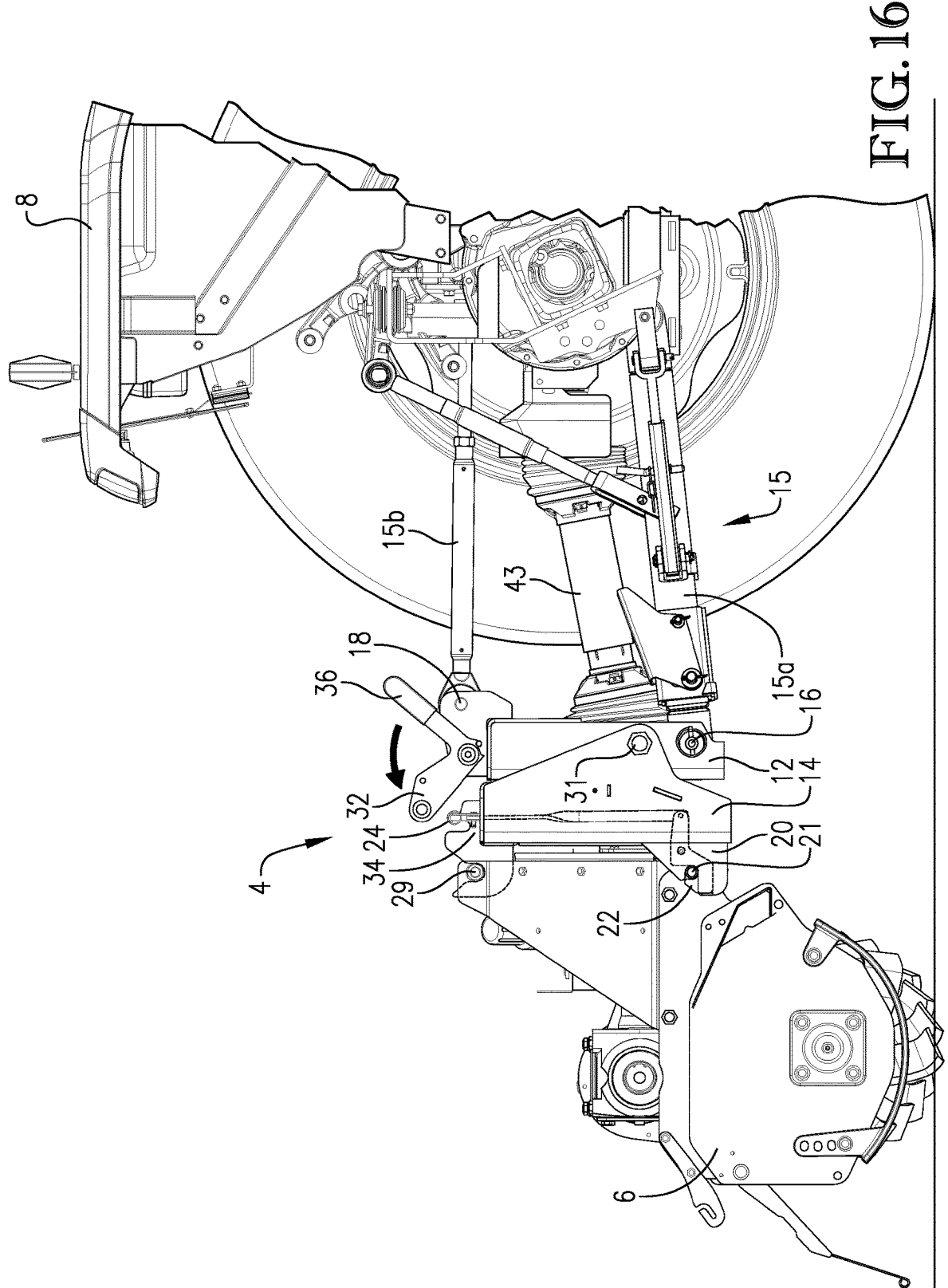
FIG. 16 is a side elevation view of the attachment assembly, the tractor, and the implement from FIGS. 12, 13, and 15, with the implement being lowered to the ground and the attachment assembly being shifted from an open configuration to a closed configuration.
Figure 17:
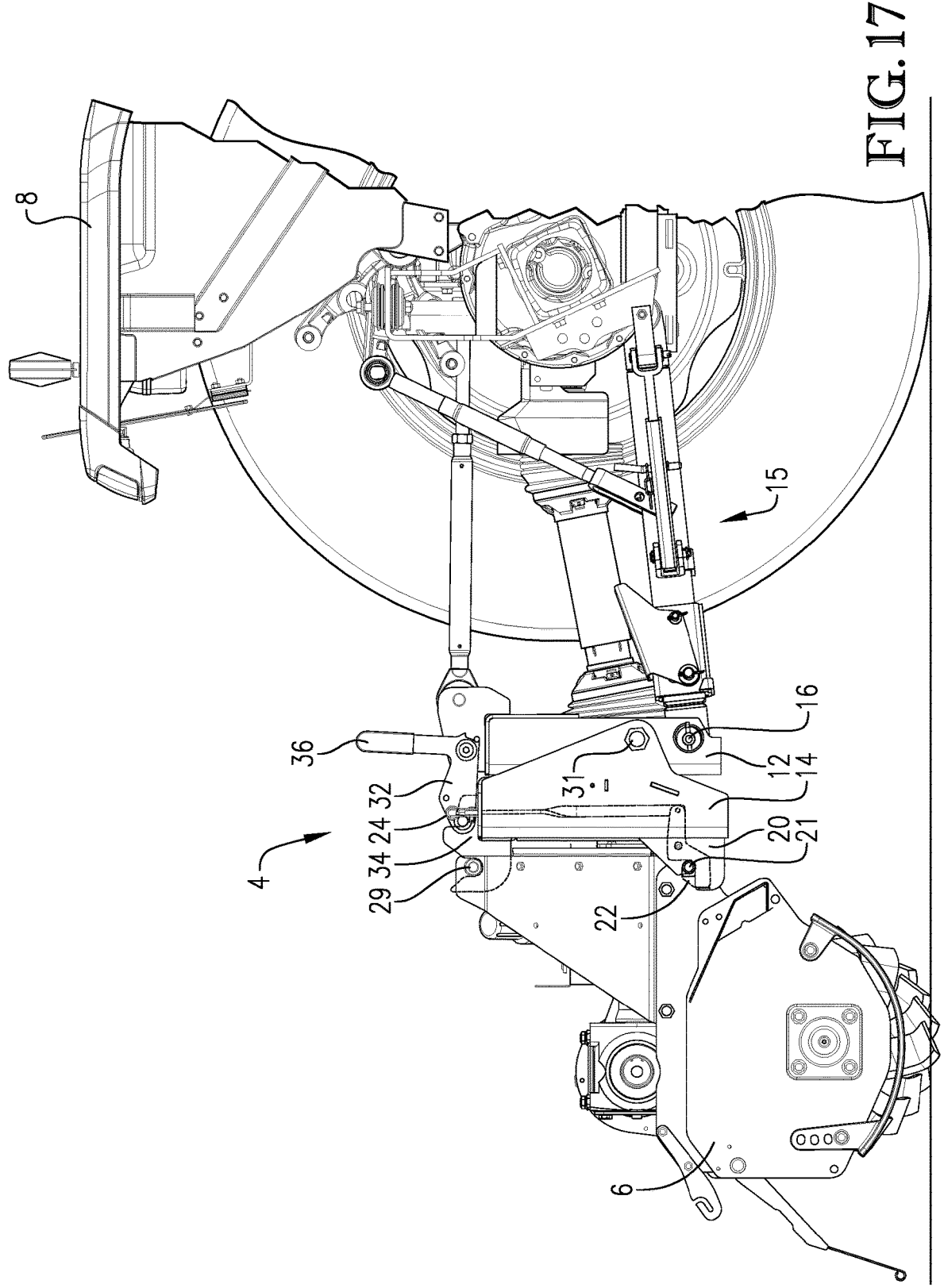
FIG. 17 is a side elevation view of the attachment assembly, the tractor, and the implement from FIGS. 12, 13, 15 and 16, with the attachment assembly being shown locked in the closed configuration via a frame release assembly.
Figure 18:
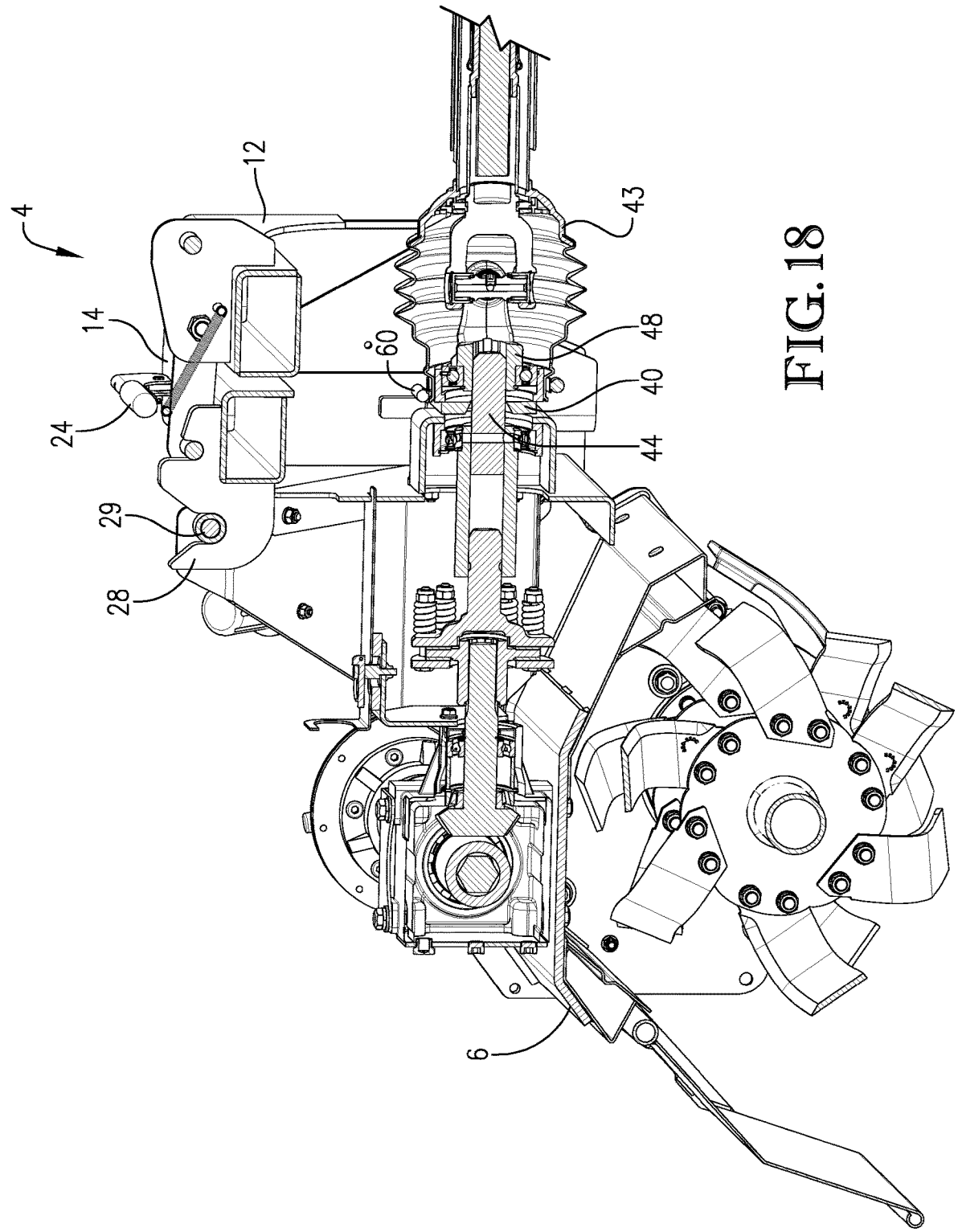
FIG. 18 is a cross-section view of the attachment assembly, a portion of the tractor, and the implement from FIG. 17, illustrating a power-take off (PTO) driveline of the implement being engaged with the attachment assembly and with a PTO connection assembly of the tractor.

In more detail, the attachment assembly 4 (via the three-point hitch 15) may be lowered until the implement 6 contacts the ground, as shown in FIG. 16. Upon the implement 6 contacting the ground, the implement-side frame 14 may be forced forward, rotating about the support pins 31, until the attachment assembly 4 is in the closed configuration with the implement-side frame 14 adjacent to the tractor-side frame 12. The attachment assembly 4 can be locked in the closed configuration by actuating the frame release lever 36, as shown in FIG. 17, such that the frame latch element 32 of the tractor-side frame 12 engages with the frame hook element 34 on the implement-side frame 14. As noted above, such actuation of the frame release lever 36 may generally be performed by the operator, while the operator remains positioned on the tractor 8 (e.g., while sitting in the operating seat or while standing adjacent the operating seat of the tractor 8). As such, the operator may not be required to dismount the tractor 8 to complete the connection of the implement 6 with the tractor 8. Beneficially, with the implement 6 securely engaged with the attachment assembly 4, and with the attachment assembly 4 in the closed configuration, the PTO driveline 44 of the implement 6 will be fully engaged, as shown in FIG. 18, within the female mating portion of the U-joint 48 of the PTO connection assembly 43 extending from the tractor 8. As was previously described, such engagement is facilitated via the PTO adapter 40 of the attachment assembly 4, which ensures proper alignment between the PTO driveline 44 of the implement 6 with the PTO connection assembly 43 of the tractor 8.

With the attachment assembly 4 in the closed configuration, as shown in FIG. 17, the implement 6 will be securely held in engagement to the three-point hitch 15 of the tractor 8 via the attachment assembly 4. As such, the tractor 8 can maneuver wherever needed, while pulling the implement 6 behind to perform intended operations. Beneficially, the attachment assembly 4 also facilitates connection between the PTO drive system of the tractor 8 and the PTO receiving system of the implement 6. Thus, rotary power can be provided by the tractor 8 to the implement 6 via the attachment assembly 4. As an example, the figures illustrate an implement 6 in the form of a tiller. The tiller is shown securely attached to the rear of the tractor 8 via the attachment assembly 4, which securely engages with the front of the tiller and the three-point hitch 15 of the tractor 8. As such, the tractor 8 can pull the tiller where needed. In addition, the attachment assembly 4 facilitates connection between the PTO drive system of the tractor 8 and the PTO receiving system of the tiller, such that as the tiller is being pulled, the tractor 8 can impart rotary power to the tiller so that the tiller can perform tiller operations (e.g., the tiller's blades can be caused to rotate).

Figure 19:
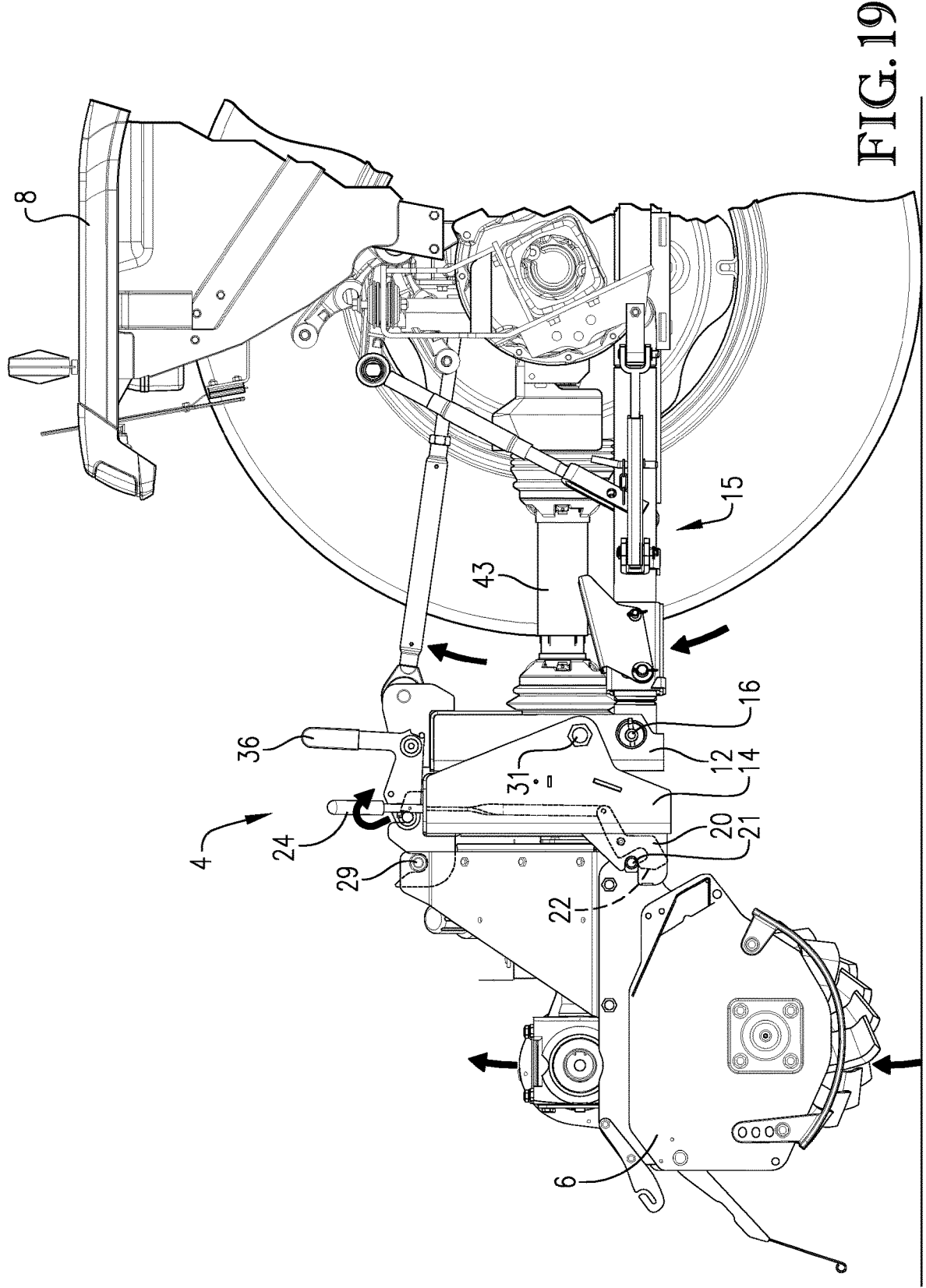
FIG. 19 is a side elevation view of the attachment assembly, the tractor, and the implement from FIGS. 12, 13, and 15-17, with the implement being raised off the ground and an implement release assembly of the attachment assembly being unlocked to permit disengagement of the bottom of the implement from the attachment assembly.
Figure 20:
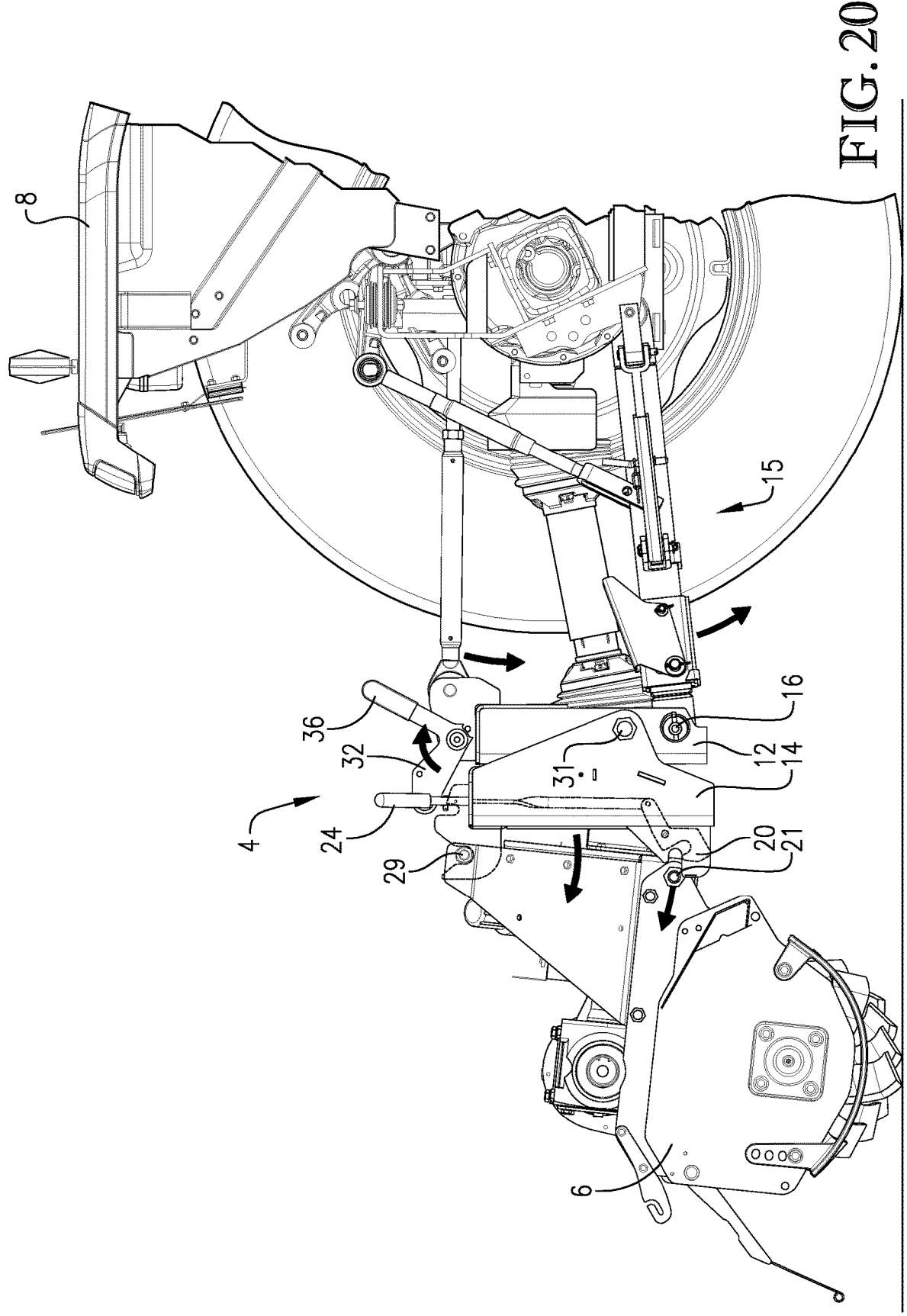
FIG. 20 is a side elevation view of the attachment assembly, the tractor, and the implement from FIGS. 12, 13, 15-17, and 19, with the implement being lowered back to the ground and the frame release assembly being unlocked such that the attachment assembly can shift from the closed configuration to the open configuration.

To remove the implement 6 from the tractor 8, the operator can raise the implement 6 off the ground and actuate each of the implement release levers 24, as shown in FIG. 19, so as to unlock the implement latch elements 22 of the implement release assembly. Beneficially, given the position of the implement release levers 24 (i.e., extending from the upper bar 14a of the implement-side frame 14), the operator of the tractor 8 may generally perform actuation of the implement release levers 24 while the operator remains positioned on the tractor 8 (e.g., while sitting in the operating seat or while standing adjacent the operating seat of tractor 8). With the implement 6 raised off the ground, and with the implement latch elements 22 in the unlocked position, the lower hitch pins 21 of the implement 6 can be released from the lower engagement hooks 20 of the implement-side frame 14. In some embodiments, the implement 6 will need to be returned to the ground, as shown in FIG. 20, in order for the lower hitch pins 21 to disengage themselves from the lower engagement hooks 20. Generally, the force of the implement 6 on the ground will cause the implement 6 to rotate rearward such that the lower hitch pins 21 are released from the lower engagement hooks 20.

Upon releasing the lower hitch pins 21 of the implement from the lower engagement hooks 20, and the attachment assembly 4 (still in the closed configuration) lowered into contact with the ground, the frame release lever 36 can be actuated, as illustrated in FIG. 20, so as to release the frame latch element 32 of the tractor-side frame 12 from its engagement with the frame hook element 34 of the implement-side frame 14. As noted previously, such actuation of the frame release lever 36 can be performed by the operator of the tractor 8 while seated in the operating seat of the tractor 8 without needing to dismount the tractor 8. With the frame release assembly releasing the implement-side frame 14 from the tractor-side frame 12, the attachment assembly 4 is free to actuate from the closed configuration to the open configuration (i.e., the implement-side frame 14 can rotate rearward away from the tractor-side frame 12).

Figure 21:
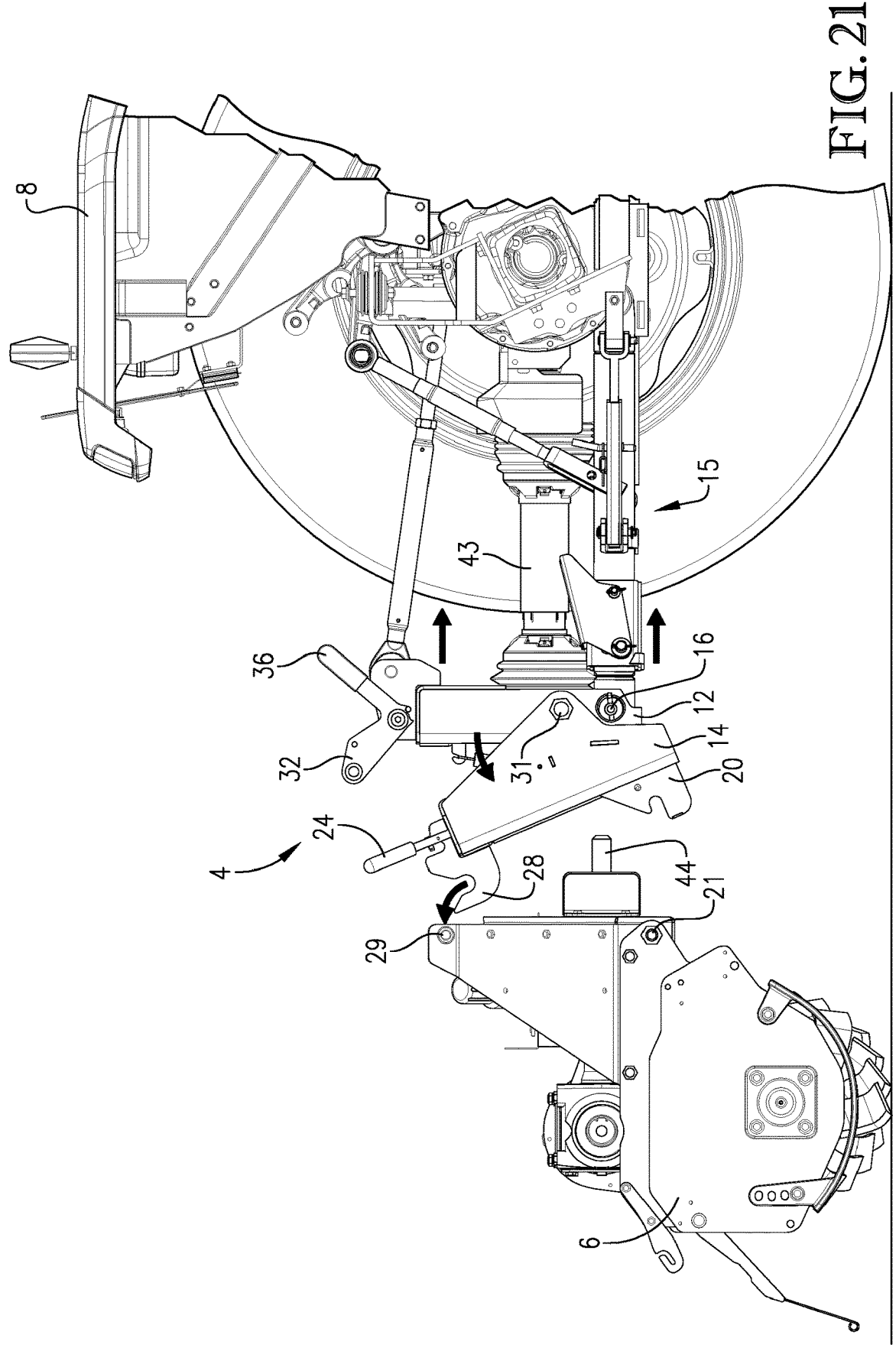
FIG. 21 is a side elevation view of the attachment assembly, the tractor, and the implement from FIGS. 12, 13, 15-17, and 20, with the tractor and the attachment assembly being separated from the implement.

As illustrated in FIG. 21, the attachment assembly 4 being in the open configuration permits the operator to disconnect the implement 6 from the attachment assembly 4. Specifically, as was noted previously, the implement latch elements 22 on the side bars 14b of the implement-side frame 14 are unlocked, such that the lower hitch pins 21 of the implement 6 are released from the lower engagement hooks 20 of the attachment assembly 4. Thus, to fully remove the implement 6 from the attachment assembly 4, the operator of the tractor 8 can simultaneously lower the attachment assembly 4 (e.g., by lowering the three-point hitch 15) and pulling the tractor 8 forward, as is shown in FIG. 21. Such a maneuver will extract the upper hitch pin 29 of the implement from the upper engagement hook 28 of the implement-side frame 14. Continuing to pull the tractor 8 forward will also extract the PTO connection assembly 43 of the tractor 8 from the PTO driveline 44 of the implement 6. Thus, the attachment assembly 4 will be free from the implement 6. As such, embodiments provide for the tractor 8 to quickly and efficiently connect with and disconnect from another implement (not shown) by repeating the process described above.

Figure 22:
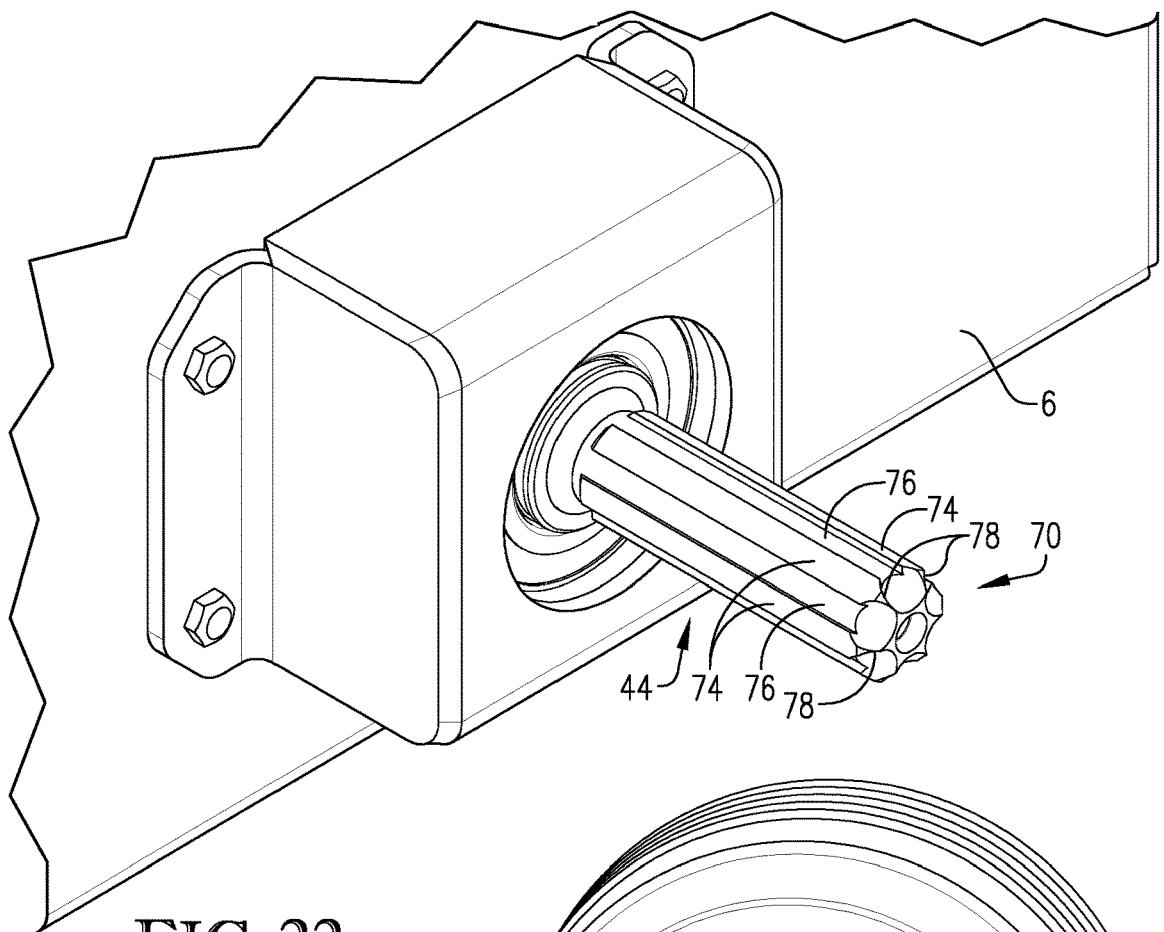
FIG. 22 is a perspective view of a portion of a PTO driveline of an attachment according to embodiments of the present invention, particularly illustrating a connection rod of the PTO driveline with a plurality of splines having knife-shaped edges.

To aid in proper PTO connection between the implement 6 and the tractor 8 (e.g., via the attachment assembly 4), the PTO driveline 44 of the implement 6 and the PTO connection assembly 43 of the tractor 8 may, in some embodiments, be configured with cooperative shapes to provide a matingly securable connection. For example, as illustrated in FIG. 22, a free end of the PTO driveline 44 of the implement 6 may comprise a male connection stub 70 that is configured to be matingly engaged with a female receptacle 72 of the PTO connection assembly 43 of the tractor 8. The connection stub 70 may be configured as a solid rod section with a plurality of elongated spline segments 74 extending longitudinally along an outer surface of the connection stub 70. The spline segments 74 may be spaced circumferentially about the connection stub 70, such that the spline segments 74 are separated apart by grooves 76. As such, the spline segments 74 extend further away (in a radial direction) from a longitudinal centerline/axis of the connection stub 70 than the grooves 76 extend. In some embodiments, a forward end of each of the spline segments 74 (i.e., the portion of the spline segments 74 located adjacent to a free end of the connection stub 70) may be narrowed and/or sharpened to form a knife edge 78. Such knife edges 78, as will be described in more detail below, can assist in proper alignment and secure connection between the PTO driveline 44 of the implement 6 and the PTO connection assembly 43 of the tractor 8.

Figure 23:
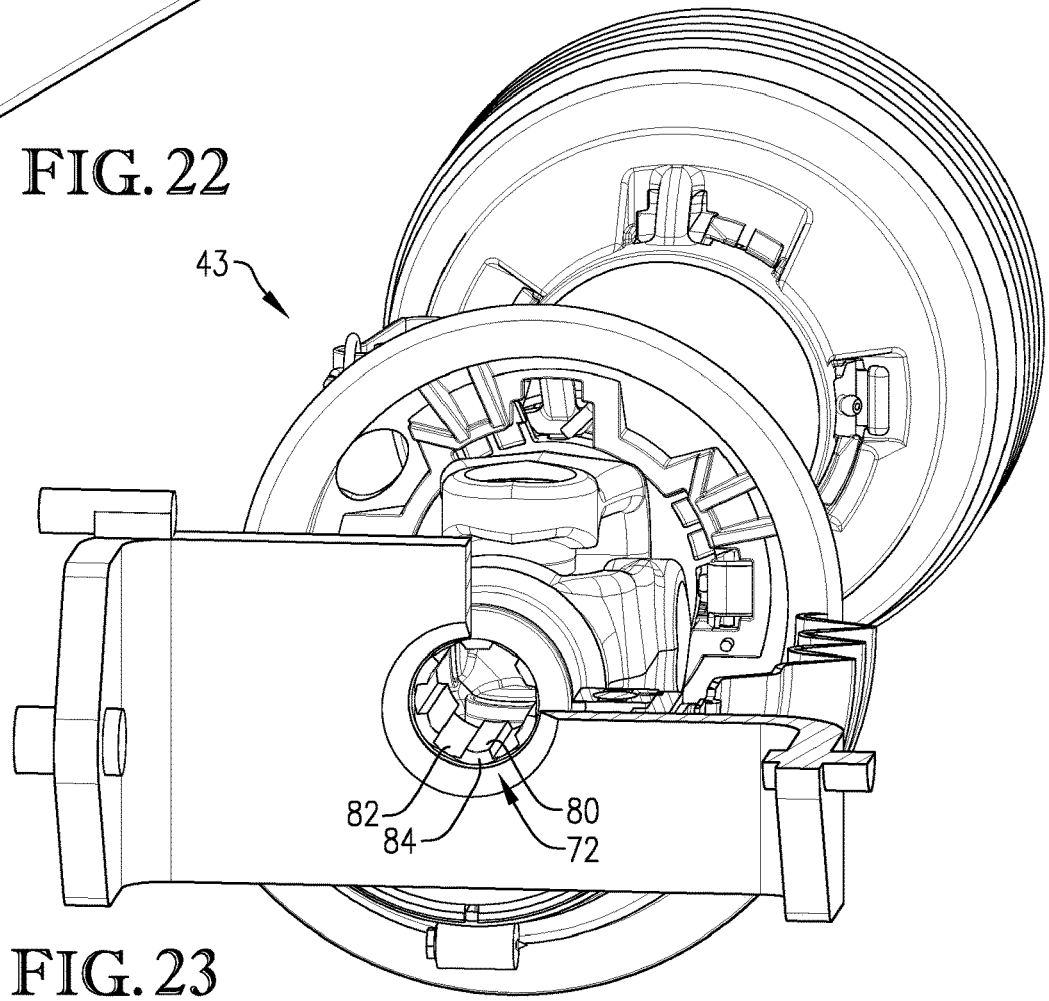
FIG. 23 is a perspective view of a portion of a PTO connection assembly of a tractor according to embodiments of the present invention, particularly illustrating a receptacle configured to receive the connection rod from FIG. 22, and with the receptacle including a plurality of splines with rounded ends.

Turning to the PTO connection assembly 43 of the tractor 8, as illustrated in FIG. 23, the receptacle 72 may be configured as a hollow cylinder with a plurality of elongated spline segments 80 extending longitudinally along an inner surface of the receptacle 72. The spline segments 80 may be spaced circumferentially about the receptacle 72, such that the spline segments 80 are separated apart by grooves 82. As such, the spline segments 80 extend closer towards (in a radial direction) a longitudinal centerline/axis of the receptacle 72 than the grooves 82. In some embodiments, a rearward end of each of the spline segments 80 (i.e., the portion of the spline segments 80 located adjacent to an open, free end of the receptacle 72) may have a convex-shaped, rounded end 84. Such rounded ends 84, as will be described in more detail below, can assist in proper alignment and secure connection between the PTO driveline 44 of the implement 6 and the PTO connection assembly 43 of the tractor 8.

In more detail, during connection of an attachment 6, the attachment assembly 4 will be directed to toward the attachment 6 via the tractor 8. Specifically, the PTO connection assembly 43 of the tractor 8 will be positioned adjacent to the PTO driveline 44 of the implement 6 such that the receptacle 72 is adjacent to (e.g., positioned directly forward of) the connection stub 70. As such, the connection stub 70 can be inserted within the receptacle 72 (via movement of the attachment assembly 4) so as to impart rotary power from the tractor 8 to the attachment 6. A proper PTO connection between the connection stub 70 and the receptacle 72 will include the spline segments 74 of the connection stub 70 being received within the grooves 82 of the receptacle 72, and the spline segments 80 of the receptacle 72 being received within the grooves 76 of the connection stub 70. To ensure such proper PTO connection, during engagement of the connection stub 70 within the receptacle 72, the knife edges 78 of the spline segments 74 of the connection stub 70 may make contact with the round ends 84 of the spline segments 80 of the receptacle 72, such that the knife edges 78 are forced to slide along the surfaces of the round ends 84 and to direct such spline segments 74 of the connection stub 70 into alignment/engagement with the grooves 82 of the receptacle 72 (and similarly direct the spline segments 80 of the receptacle 72 into alignment/engagement with the grooves 76 of the connection stub 70). Upon successful insertion of the connection stub 70 within the receptacle 72, the PTO connection assembly 43 of the tractor 8 can impart rotary power to the implement 6 via the PTO driveline 44.

Figure 24:
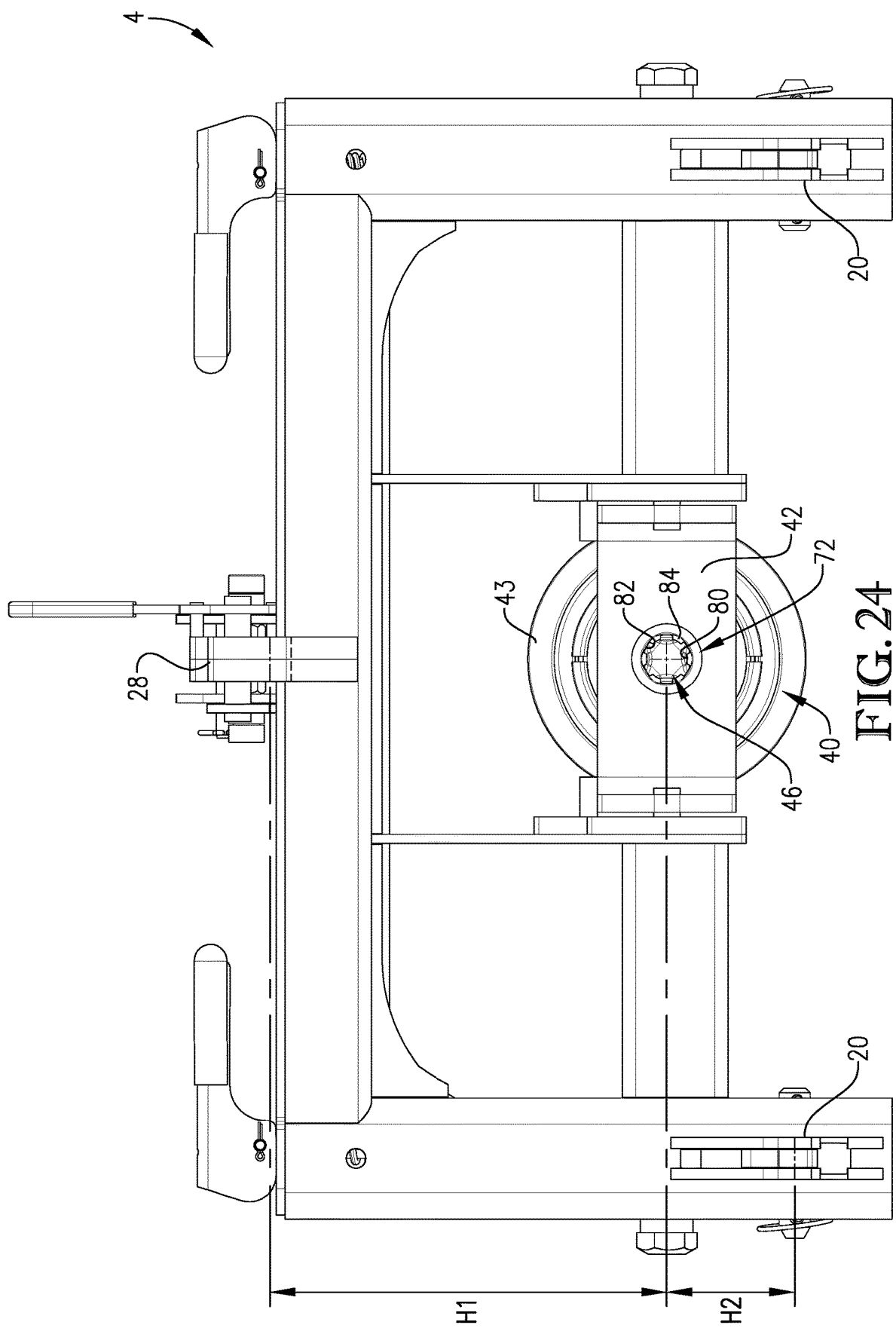
FIG. 24 is a rear elevation view of the attachment assembly according to embodiments of the present invention, particularly illustrating a position of a PTO adapter with respect to certain remaining components of the attachment assembly.

In some embodiments, the position of the PTO adapter 40 may be particularly established to facilitate efficient connection and transfer of power between the PTO connection assembly 43 of the tractor 8 and the PTO driveline 44 of the implement 6. For example, as illustrated in FIG. 24, the PTO adapter 40 may be positioned generally centrally with respect to a lateral direction of the attachment assembly 4. Specifically, the opening 46 of the PTO adapter 40 may be generally equidistant from the lower engagement hooks 20 of the attachment assembly 4, which as described previously, are configured to receive the lower hitch pins 21 of the implement 6 (not shown in FIG. 24). As such, upon the PTO connection assembly 43 being coupled with the PTO adapter 40, the longitudinal centerline/axis of the receptacle 72 will likewise be positioned generally equidistant from the lower engagement hooks 20 of the attachment assembly 4.

In contrast, the PTO adapter 40 may be positioned closer to the lower engagement hooks 20, with respect to a vertical direction, than the upper engagement hook 28 of the attachment assembly 4. Specifically, the opening 46 of the PTO adapter 40 may be positioned a distance H1 from the upper engagement hook 28 of the attachment assembly 4, and a distance H2 from the lower engagement hooks 20 of the attachment assembly 4. As such, upon the PTO connection assembly 43 being coupled with the PTO adapter 40, the longitudinal centerline/axis of the receptacle 72 will likewise be positioned at the distance H1 from the upper engagement hook 28 and the distance H2 from the lower engagement hooks 20. In general, the distance H1 will be greater than the distance H2. In some specific embodiments a ratio of H1:H2 will be about 2:1, 2.1:1, 2.2:1, 2.3:1, 2.4:1, 2.5:1, 2.6:1, 2.7:1, 2.8:1, 2.9:1, or about 3:1. In some embodiments, the ratio of H1:H2 will be between 2:1 and 3:1, between 2.2:1 and 2.6.1, and/or between 2.3:1 and 2.5:1.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

What is claimed is:

1. An attachment assembly for connecting an agricultural implement to a tractor, said attachment assembly comprising:
   a tractor-side frame configured to extend from a rear of the tractor;
   an implement-side frame configured to be removably attached to the implement; and
   at least one implement release lever shiftable between a locked position and an unlocked position and configured to release the implement from attachment to said implement-side frame when said implement release lever is shifted into said unlocked position,
   wherein said implement-side frame is configured to rotate with respect to said tractor-side frame about a pivot axis, wherein the pivot axis is presented by a bolted connection that rotatably secures said implement-side frame to said tractor-side frame.

2. The attachment assembly of claim 1, wherein said implement-side frame and said tractor-side frame remain secured to one another when said implement release lever is in said unlocked position.

3. The attachment assembly of claim 1, wherein said pivot axis is located closer to a bottom of the attachment assembly than to a top of the attachment assembly.

4. The attachment assembly of claim 1, wherein the attachment assembly comprises at least two bolted connections that rotatably secure said implement-side frame to said tractor-side frame, wherein said bolted connections cooperatively define the pivot axis, with the pivot axis being located closer to a bottom of the attachment assembly than to a top of the attachment assembly.

5. The attachment assembly of claim 1, wherein the attachment assembly is shiftable between an open configuration and a closed configuration, wherein when the attachment assembly is in said open configuration upper portions of said tractor-side and implement-side frames are spaced farther from one another than when the attachment assembly is in said closed configuration.

6. The attachment assembly of claim 5, further comprising a frame latch element for securely maintaining said attachment assembly in said closed configuration.

7. The attachment assembly of claim 6, further comprising a frame release lever for selectively releasing said frame latch element to thereby permit shifting of said attachment assembly from said closed configuration into said open configuration.

8. The attachment assembly of claim 1, further comprising a power take-off (PTO) adapter configured to facilitate a rotary-power connection between the tractor and the implement.

9. The attachment assembly of claim 8, wherein said attachment assembly is configured to be removably attached to the rear of the tractor, and wherein said PTO adapter is configured to be removably engaged with the tractor-side frame or to the implement-side frame.

10. The attachment assembly of claim 8, wherein said PTO adapter is engaged with said implement-side frame, and wherein said PTO adapter is configured to pivot with respect to said implement-side frame.

11. The attachment assembly of claim 1, wherein each of said tractor-side frame and said implement-side frame comprises a pair of spaced apart, vertically-extending side bars and a horizontally-extending upper bar extending between said side bars, wherein said tractor-side frame is configured to be removably attached to a three-point linkage of the tractor by securing each lifting arm of the three-point linkage with one of said side bars of said tractor-side frame via a lower hitch pin, and by securing a top link of the three-point linkage to said upper bar of said tractor-side frame via an upper hitch pin, wherein said implement-side frame is configured to be attached to the implement by securing an upper hitch pin of the implement within an upper engagement hook extending from said upper bar of said implement-side frame, wherein said implement-side frame is configured to be attached to the implement by securing a pair of lower hitch pins of the implement within a pair of lower engagement hooks extending rearward from said side bars of said implement-side frame, wherein said implement-side frame incudes a latch element associated with each lower engagement hook, wherein each latch element is configured to be selectively positioned in a locked position and an unlocked position by a lever or a cable, wherein in the locked positions said latch elements are configured to restrict the lower hitch pins from being removed from said lower engagement hooks, wherein said implement-side frame includes a biasing element associated with each latch element, wherein said biasing elements are configured to bias the latch elements in the locked positions.

12. The attachment assembly of claim 1, wherein each of said tractor-side frame and said implement-side frame comprises a pair of spaced apart, vertically-extending side bars and a horizontally-extending upper bar extending between said side bars, wherein said side bars of said implement-side frame are pivotally secured to said side bars of said tractor-side frame.

13. An attachment assembly for connecting an agricultural implement to a tractor, said attachment assembly comprising:
   a tractor-side frame configured to extend from a rear of the tractor; and
   an implement-side frame configured to be removably attached to the implement;
   wherein said tractor-side frame and said implement-side frame are configured to rotate relative to one another on a pivot axis, wherein the pivot axis is presented by a bolted connection that rotatably secures said implement-side frame to said tractor-side frame,
   wherein said pivot axis is located closer to a bottom of the attachment assembly than to a top of the attachment assembly.

14. A method of attaching an implement to a tractor, said method comprising the steps of:

(a) providing an attachment assembly extending from a rear of the tractor, wherein the attachment assembly comprises a tractor-side frame and an implement-side frame rotatably coupled with the tractor-side frame via a bolted connection, wherein the bolted connection presents a pivot axis about which the implement-side frame is configured to rotate with respect to the tractor-side frame,
   wherein the attachment assembly is configured to be shifted from a closed configuration, in which the implement-side frame is positioned adjacent to the tractor-side frame, to an open configuration, in which at least a portion of the implement-side frame is rotated away from the tractor-side frame;
   (b) shifting the attachment assembly to the open configuration;
   (c) securing the implement-side frame to the implement; and
   (d) shifting the attachment assembly to the closed configuration
   wherein said implement-side frame and said tractor-side frame remain pivotably secured to one another during steps (b), (c), and (d).

15. The method of claim 14, wherein said providing of step (a) includes releasably securing the tractor-side frame to a three-point hitch of the tractor.

16. The method of claim 14, wherein said shifting of step (b) includes unlocking a frame release assembly securing the implement-side frame to the tractor-side frame.

17. The method of claim 14, wherein said securing of step (c) includes:
   engaging an upper engagement hook of the implement-side frame with an upper hitch pin of the implement,
   raising the implement with the attachment assembly, and
   engaging a pair of lower engagement hooks of the implement-side frame with a pair of lower hitch pins of the implement.

18. The method of claim 14, wherein said securing of step (c) includes engaging a power take-off (PTO) driveline of the implement with a PTO adapter associated with the implement-side frame.

19. The method of claim 18, wherein said shifting of step (d) includes lowering the implement into contact with the ground via the attachment assembly and locking the attachment assembly in the closed configuration.

* * * * *